US010522033B2

(12) United States Patent
McClellan et al.

(10) Patent No.: US 10,522,033 B2
(45) Date of Patent: Dec. 31, 2019

(54) VEHICLE MONITORING DEVICES AND METHODS FOR MANAGING MAN DOWN SIGNALS

(71) Applicant: INTHINC LLC, Rochelle Park, NJ (US)

(72) Inventors: Scott McClellan, Heber City, UT (US); Todd Follmer, Coto de Caza, CA (US); Jonathan C. Catten, Salt Lake City, UT (US); Eric Capps, Salt Lake City, UT (US); Dave Ord, Salt Lake City, UT (US); Richard Eyre, Salt Lake City, UT (US); Verlin Russon, Lehi, UT (US); Ed Maynard, Salt Lake City, UT (US)

(73) Assignee: INTHINC LLC, Rochelle Park, NJ (US)

( * ) Notice: Subject to any disclaimer, the term of this patent is extended or adjusted under 35 U.S.C. 154(b) by 0 days.

(21) Appl. No.: 15/810,958

(22) Filed: Nov. 13, 2017

(65) Prior Publication Data
US 2018/0233039 A1 Aug. 16, 2018

Related U.S. Application Data

(63) Continuation of application No. 14/516,879, filed on Oct. 17, 2014, now Pat. No. 9,847,021, which is a
(Continued)

(51) Int. Cl.
*G08G 1/052* (2006.01)
*G08G 1/0967* (2006.01)
(Continued)

(52) U.S. Cl.
CPC ............ *G08G 1/052* (2013.01); *G01S 5/0027* (2013.01); *G06Q 10/06398* (2013.01);
(Continued)

(58) Field of Classification Search
CPC ........................ G08B 21/0269; G08B 21/182; G08B 25/004; G08B 25/016; G08G 1/052;
(Continued)

(56) References Cited

U.S. PATENT DOCUMENTS

| 606,486 A | 6/1898 | Lord |
| 3,975,708 A | 8/1976 | Lusk |

(Continued)

FOREIGN PATENT DOCUMENTS

| CA | 2071931 | 12/1993 |
| CA | 2307259 | 10/2001 |

(Continued)

OTHER PUBLICATIONS

Almazan et al., "Full auto-calibration of a smartphone on board a vehicle using IMU and GPS embedded sensors", Intelligent Vehicles Symposium (IV), 2013 IEEE; Digital Object Identifier: 10.1109/IVS.2013.6629658; Publication Year: Jun. 2013, pp. 1374-1380.

(Continued)

*Primary Examiner* — Hai Phan
*Assistant Examiner* — Son M Tang
(74) *Attorney, Agent, or Firm* — Workman Nydegger

(57) ABSTRACT

System and method for identifying speeding violations, comprising determining a current speed and a current location of a vehicle, determining a posted speed limit for the current location from a speed-by-street database, comparing the current speed of the vehicle to the posted speed limit, and evaluating whether the current speed exceeds the posted speed limit. Errors are identified in the speed-by-street database by storing a plurality of speeding violation records, wherein the speeding violation records each include a speeding event location; analyzing the speeding violation records to identify one or more speeding event locations having multiple speeding violations; comparing a posted speed
(Continued)

limit at the one or more speeding event locations having multiple speeding violations to corresponding speed limit data in the speed-by-street database; and identifying one or more speed limit entries in the speed-by-street database that do not match the posted speed limit.

16 Claims, 7 Drawing Sheets

Related U.S. Application Data continuation of application No. 12/975,489, filed on Dec. 22, 2010, now Pat. No. 8,890,717, which is a continuation of application No. 11/805,238, filed on May 22, 2007, now Pat. No. 7,859,392.

(60) Provisional application No. 60/802,478, filed on May 22, 2006.

(51) Int. Cl.
*H04W 4/02* (2018.01)
*G01S 5/00* (2006.01)
*G06Q 10/06* (2012.01)
*G08G 1/00* (2006.01)

(52) U.S. Cl.
CPC ... *G08G 1/09675* (2013.01); *G08G 1/096725* (2013.01); *G08G 1/096791* (2013.01); *H04W 4/027* (2013.01); *G08G 1/20* (2013.01)

(58) Field of Classification Search
CPC ......... G08G 1/096725; G08G 1/09675; G08G 1/096791; G08G 1/20; G01S 5/0027; G06Q 10/06398; H04W 4/027
See application file for complete search history.

(56) References Cited

U.S. PATENT DOCUMENTS

| | | | |
|---|---|---|---|
| 4,331,953 A * | 5/1982 | Blevins | G08B 25/016 340/12.5 |
| 4,344,136 A | 8/1982 | Panik | |
| 4,369,427 A | 1/1983 | Drebinger et al. | |
| 4,395,624 A | 7/1983 | Wartski | |
| 4,419,654 A | 12/1983 | Funk | |
| 4,458,535 A | 7/1984 | Juergens | |
| 4,591,823 A | 5/1986 | Horvat | |
| 4,608,551 A | 8/1986 | Takeo | |
| 4,785,280 A | 11/1988 | Fubini | |
| 4,843,578 A | 6/1989 | Wade | |
| 4,910,493 A * | 3/1990 | Chambers | B60R 25/102 180/287 |
| 4,926,417 A | 5/1990 | Futami | |
| 4,939,652 A | 7/1990 | Steiner | |
| 5,006,829 A | 4/1991 | Miyamoto et al. | |
| 5,032,821 A | 7/1991 | Domanico | |
| 5,045,839 A * | 9/1991 | Ellis | G08B 21/0415 340/309.7 |
| 5,064,151 A | 11/1991 | Cerimele et al. | |
| 5,074,144 A | 12/1991 | Krofchalk et al. | |
| 5,119,504 A | 6/1992 | Durboraw, III | |
| 5,223,844 A | 6/1993 | Mansell et al. | |
| 5,225,842 A | 7/1993 | Brown et al. | |
| 5,303,163 A | 4/1994 | Ebaugh et al. | |
| 5,305,214 A | 4/1994 | Komatsu | |
| 5,309,139 A | 5/1994 | Austin | |
| 5,311,197 A | 5/1994 | Sorden et al. | |
| 5,325,082 A | 6/1994 | Rodriguez | |
| 5,347,260 A | 9/1994 | Ginzel | |
| 5,353,023 A | 10/1994 | Mitsugi | |
| 5,359,528 A | 10/1994 | Haendel | |
| 5,365,114 A | 11/1994 | Tsurushima | |
| 5,365,451 A | 11/1994 | Wang et al. | |
| 5,384,155 A | 1/1995 | Gerber | |
| 5,394,136 A | 2/1995 | Lammers | |
| 5,400,018 A | 3/1995 | Scholl | |
| 5,414,432 A | 5/1995 | Penny, Jr. et al. | |
| 5,422,624 A | 6/1995 | Smith | |
| 5,424,584 A | 6/1995 | Matsuda | |
| 5,430,432 A | 7/1995 | Camhi | |
| 5,436,612 A | 7/1995 | Aduddell | |
| 5,436,837 A | 7/1995 | Gerstung | |
| 5,446,659 A | 8/1995 | Yamawaki | |
| 5,453,939 A | 9/1995 | Hoffman | |
| 5,457,439 A | 10/1995 | Kuhn | |
| 5,475,597 A | 12/1995 | Buck | |
| 5,485,116 A | 1/1996 | Cserveny et al. | |
| 5,485,161 A | 1/1996 | Vaughn | |
| 5,499,182 A | 3/1996 | Ousborne | |
| 5,521,579 A | 5/1996 | Bernhard | |
| 5,521,580 A | 5/1996 | Kaneko | |
| 5,525,960 A | 6/1996 | McCall | |
| 5,546,305 A | 8/1996 | Kondo | |
| 5,548,273 A | 8/1996 | Nicol | |
| 5,570,087 A | 10/1996 | Lemelson | |
| 5,581,464 A | 12/1996 | Woll | |
| 5,586,131 A | 12/1996 | Doyle | |
| 5,600,558 A | 2/1997 | Mearek | |
| 5,612,875 A | 3/1997 | Haendel | |
| 5,617,086 A | 4/1997 | Klashinsky et al. | |
| 5,625,337 A | 4/1997 | Medawar | |
| 5,638,077 A | 6/1997 | Martin | |
| 5,642,284 A | 6/1997 | Parupalli | |
| 5,648,755 A | 7/1997 | Yagihashi | |
| 5,659,289 A | 8/1997 | Zonkoski | |
| 5,689,067 A | 11/1997 | Klein | |
| 5,708,417 A | 1/1998 | Tallman | |
| 5,717,374 A | 2/1998 | Smith | |
| 5,719,771 A | 2/1998 | Buck | |
| 5,723,768 A | 3/1998 | Ammon | |
| 5,731,285 A | 3/1998 | Pavone et al. | |
| 5,731,785 A | 3/1998 | Lemelson | |
| 5,740,548 A | 4/1998 | Hudgens | |
| 5,742,915 A | 4/1998 | Stafford | |
| 5,751,245 A | 5/1998 | Janky et al. | |
| 5,764,139 A | 6/1998 | Nojima | |
| 5,767,767 A | 6/1998 | Lima | |
| 5,777,580 A | 7/1998 | Janky et al. | |
| 5,795,997 A | 8/1998 | Gittins | |
| 5,797,134 A | 8/1998 | McMillan et al. | |
| 5,801,618 A | 9/1998 | Jenkins et al. | |
| 5,801,948 A | 9/1998 | Wood | |
| 5,815,071 A | 9/1998 | Doyle | |
| 5,819,090 A | 10/1998 | Wolf et al. | |
| 5,819,198 A | 10/1998 | Peretz | |
| 5,825,283 A | 10/1998 | Camhi | |
| 5,825,284 A | 10/1998 | Dunwoody | |
| 5,829,782 A | 11/1998 | Breed et al. | |
| 5,844,475 A | 12/1998 | Horie | |
| 5,847,271 A | 12/1998 | Poublon | |
| 5,862,500 A | 1/1999 | Goodwin | |
| 5,867,093 A | 2/1999 | Dodd | |
| 5,877,678 A | 3/1999 | Donoho | |
| 5,880,674 A | 3/1999 | Ufkes | |
| 5,880,958 A | 3/1999 | Helms et al. | |
| 5,883,594 A | 3/1999 | Lau | |
| 5,892,434 A | 4/1999 | Carlson | |
| 5,907,277 A | 5/1999 | Tokunaga | |
| 5,914,654 A | 6/1999 | Smith | |
| 5,918,180 A | 6/1999 | Dimino | |
| 5,926,087 A | 7/1999 | Busch | |
| 5,928,291 A | 7/1999 | Jenkins et al. | |
| 5,933,080 A | 8/1999 | Nojima | |
| 5,941,915 A | 8/1999 | Federle et al. | |
| 5,945,919 A | 8/1999 | Trask | |
| 5,949,330 A | 9/1999 | Hoffman | |
| 5,949,331 A | 9/1999 | Schofield | |
| 5,952,941 A | 9/1999 | Mardirossian | |
| 5,954,781 A | 9/1999 | Slepian | |
| 5,955,942 A | 9/1999 | Slifkin | |
| 5,957,986 A | 9/1999 | Coverdill | |

(56) References Cited

U.S. PATENT DOCUMENTS

| | | | |
|---|---|---|---|
| 5,964,816 A | 10/1999 | Kincaid |
| 5,969,600 A | 10/1999 | Tanguay |
| 5,974,356 A | 10/1999 | Doyle et al. |
| 5,978,737 A | 11/1999 | Pawlowski |
| 5,982,278 A | 11/1999 | Cuvelier |
| 5,987,976 A | 11/1999 | Sarangapani |
| 5,999,125 A | 12/1999 | Kurby |
| 6,002,327 A | 12/1999 | Boesch |
| 6,008,724 A | 12/1999 | Thompson |
| 6,018,293 A | 1/2000 | Smith |
| 6,026,292 A | 2/2000 | Coppinger et al. |
| 6,028,508 A | 2/2000 | Mason |
| 6,028,510 A | 2/2000 | Tamam |
| 6,037,861 A | 3/2000 | Ying |
| 6,037,862 A | 3/2000 | Ying |
| 6,038,496 A | 3/2000 | Dobler |
| 6,044,315 A | 3/2000 | Honeck |
| 6,059,066 A | 5/2000 | Lary |
| 6,060,989 A | 5/2000 | Gehlot |
| 6,064,598 A | 5/2000 | Wilson |
| 6,064,970 A | 5/2000 | McMillan et al. |
| 6,067,008 A | 5/2000 | Smith |
| 6,067,009 A | 5/2000 | Hozuka |
| 6,072,388 A | 6/2000 | Kyrtsos |
| 6,073,007 A | 6/2000 | Doyle |
| 6,075,458 A | 6/2000 | Ladner et al. |
| 6,078,853 A | 6/2000 | Ebner |
| 6,081,188 A | 6/2000 | Kutlucinar |
| 6,084,870 A | 7/2000 | Wooten et al. |
| 6,094,149 A | 7/2000 | Wilson |
| 6,098,048 A | 8/2000 | Dashefsky |
| 6,100,792 A | 8/2000 | Ogino |
| 6,104,282 A | 8/2000 | Fragoso |
| 6,108,591 A | 8/2000 | Segal et al. |
| 6,110,108 A * | 8/2000 | Shimura ............ A61B 5/7475 600/300 |
| 6,112,145 A | 8/2000 | Zachman |
| 6,121,922 A | 9/2000 | Mohan |
| 6,122,591 A | 9/2000 | Pomerantz |
| 6,124,810 A | 9/2000 | Segal et al. |
| 6,130,608 A | 10/2000 | McKeown |
| 6,131,067 A | 10/2000 | Girerd et al. |
| 6,133,827 A | 10/2000 | Alvey |
| 6,138,516 A | 10/2000 | Tillman |
| 6,141,610 A | 10/2000 | Rothert |
| 6,147,598 A | 11/2000 | Murphy |
| 6,161,072 A | 12/2000 | Clapper |
| 6,166,658 A | 12/2000 | Testa |
| 6,172,602 B1 | 1/2001 | Hasfjord |
| 6,178,374 B1 | 1/2001 | Mohlenkamp et al. |
| 6,184,784 B1 | 2/2001 | Shibuya |
| 6,185,501 B1 | 2/2001 | Smith |
| 6,195,015 B1 | 2/2001 | Jacobs et al. |
| 6,198,995 B1 | 3/2001 | Settles |
| 6,204,756 B1 | 3/2001 | Senyk et al. |
| 6,204,757 B1 | 3/2001 | Evans |
| 6,208,240 B1 | 3/2001 | Ledesma |
| 6,212,455 B1 | 4/2001 | Weaver |
| 6,216,066 B1 | 4/2001 | Goebel |
| 6,222,458 B1 | 4/2001 | Harris |
| 6,225,898 B1 | 5/2001 | Kamiya |
| 6,227,862 B1 | 5/2001 | Harkness |
| 6,229,438 B1 | 5/2001 | Kutlucinar |
| 6,232,873 B1 | 5/2001 | Dilz |
| 6,246,933 B1 | 6/2001 | Bague |
| 6,246,948 B1 | 6/2001 | Thakker |
| 6,247,360 B1 | 6/2001 | Anderson |
| 6,249,219 B1 | 6/2001 | Perez |
| 6,253,129 B1 | 6/2001 | Jenkins et al. |
| 6,253,151 B1 | 6/2001 | Ohler et al. |
| 6,255,892 B1 | 7/2001 | Gartner |
| 6,255,939 B1 | 7/2001 | Roth |
| 6,262,658 B1 | 7/2001 | Okuda et al. |
| 6,265,989 B1 | 7/2001 | Taylor |
| 6,266,588 B1 | 7/2001 | McClellan |
| 6,278,361 B1 | 8/2001 | Magiawata |
| 6,282,491 B1 | 8/2001 | Bochmann et al. |
| 6,285,931 B1 | 9/2001 | Hattori |
| 6,289,332 B2 | 9/2001 | Menig |
| 6,294,988 B1 | 9/2001 | Shomura |
| 6,294,989 B1 | 9/2001 | Schofield |
| 6,295,492 B1 | 9/2001 | Lang |
| 6,297,768 B1 | 10/2001 | Allen, Jr. |
| 6,301,533 B1 | 10/2001 | Markow |
| 6,306,063 B1 | 10/2001 | Horgan et al. |
| 6,308,120 B1 | 10/2001 | Goodwin |
| 6,308,134 B1 | 10/2001 | Croyle et al. |
| 6,313,742 B1 | 11/2001 | Larson |
| 6,314,367 B1 | 11/2001 | Ohler et al. |
| 6,320,497 B1 | 11/2001 | Fukumoto |
| 6,331,825 B1 | 12/2001 | Ladner et al. |
| 6,333,686 B1 | 12/2001 | Waltzer |
| 6,337,653 B1 | 1/2002 | Behler |
| 6,339,739 B1 | 1/2002 | Folke |
| 6,339,745 B1 | 1/2002 | Hnovik |
| 6,343,301 B1 | 1/2002 | Halt et al. |
| 6,344,805 B1 | 2/2002 | Yasui |
| 6,351,211 B1 | 2/2002 | Bussard |
| 6,351,709 B2 | 2/2002 | King et al. |
| 6,356,188 B1 | 3/2002 | Meyers |
| 6,356,822 B1 | 3/2002 | Diaz |
| 6,356,833 B2 | 3/2002 | Jeon |
| 6,356,836 B1 | 3/2002 | Adolph |
| 6,359,554 B1 | 3/2002 | Skibinski |
| 6,362,734 B1 | 3/2002 | McQuade |
| 6,362,748 B1 | 3/2002 | Huang |
| 6,365,730 B1 | 3/2002 | Razavi |
| 6,366,199 B1 | 4/2002 | Osborn |
| 6,366,207 B1 | 4/2002 | Murphy |
| 6,378,959 B2 | 4/2002 | Lesesky |
| 6,384,740 B1 | 5/2002 | Al-Ahmed |
| 6,385,533 B1 | 5/2002 | Halt et al. |
| 6,389,340 B1 | 5/2002 | Rayner |
| 6,393,348 B1 | 5/2002 | Ziegler |
| 6,397,141 B1 * | 5/2002 | Binnig ............ G08G 1/096716 340/903 |
| 6,401,029 B1 | 6/2002 | Kubota et al. |
| 6,404,329 B1 | 6/2002 | Hsu |
| 6,405,112 B1 | 6/2002 | Rayner |
| 6,405,128 B1 | 6/2002 | Bechtolsheim et al. |
| 6,415,226 B1 | 7/2002 | Kozak |
| 6,417,764 B2 | 7/2002 | Tonkin |
| 6,424,268 B1 | 7/2002 | Isonaga |
| 6,427,687 B1 | 8/2002 | Kirk |
| 6,430,488 B1 | 8/2002 | Goldman |
| 6,433,681 B1 | 8/2002 | Foo |
| 6,438,472 B1 | 8/2002 | Tano et al. |
| 6,441,732 B1 | 8/2002 | Laitsaari |
| 6,449,540 B1 | 9/2002 | Rayner |
| 6,459,365 B2 | 10/2002 | Tamura |
| 6,459,367 B1 | 10/2002 | Green |
| 6,459,369 B1 | 10/2002 | Wang et al. |
| 6,459,961 B1 | 10/2002 | Obradovich |
| 6,459,969 B1 | 10/2002 | Bates |
| 6,462,675 B1 | 10/2002 | Humphrey |
| 6,472,979 B2 | 10/2002 | Schofield |
| 6,476,763 B2 | 11/2002 | Allen, Jr. |
| 6,480,106 B1 | 11/2002 | Crombez |
| 6,484,035 B2 | 11/2002 | Allen, Jr. |
| 6,484,091 B2 | 11/2002 | Shibata |
| 6,493,650 B1 | 12/2002 | Rodgers |
| 6,512,969 B1 | 1/2003 | Wang et al. |
| 6,512,974 B2 | 1/2003 | Houston et al. |
| 6,515,596 B2 | 2/2003 | Awada |
| 6,519,512 B1 | 2/2003 | Haas |
| 6,523,912 B1 | 2/2003 | Bond et al. |
| 6,525,672 B2 | 2/2003 | Chainer |
| 6,526,341 B1 | 2/2003 | Bird et al. |
| 6,529,159 B1 | 3/2003 | Fan et al. |
| 6,535,116 B1 | 3/2003 | Zhou |
| 6,542,074 B1 | 4/2003 | Tharman |
| 6,542,794 B2 | 4/2003 | Obradovich |
| 6,549,834 B2 | 4/2003 | McClellan et al. |
| 6,552,682 B1 | 4/2003 | Fan et al. |

(56) References Cited

U.S. PATENT DOCUMENTS

| | | |
|---|---|---|
| 6,556,905 B1 | 4/2003 | Mittelsteadt |
| 6,559,769 B2 | 5/2003 | Anthony |
| 6,564,126 B1 | 5/2003 | Lin |
| 6,567,000 B2 | 5/2003 | Slifkin |
| 6,571,168 B1 | 5/2003 | Murphy |
| 6,577,946 B2 | 6/2003 | Myr |
| 6,587,759 B2 | 7/2003 | Obradovich |
| 6,594,579 B1 | 7/2003 | Lowrey |
| 6,599,243 B2 | 7/2003 | Woltermann |
| 6,600,985 B2 | 7/2003 | Weaver |
| 6,604,033 B1 | 8/2003 | Banet |
| 6,609,063 B1 | 8/2003 | Bender et al. |
| 6,609,064 B1 | 8/2003 | Dean |
| 6,611,740 B2 | 8/2003 | Lowrey |
| 6,611,755 B1 | 8/2003 | Coffee et al. |
| 6,615,137 B2 | 9/2003 | Lutter et al. |
| 6,622,085 B1 | 9/2003 | Amita et al. |
| 6,629,029 B1 | 9/2003 | Giles |
| 6,630,884 B1 | 10/2003 | Shanmugham |
| 6,631,322 B1 | 10/2003 | Arthur et al. |
| 6,633,807 B2 | 10/2003 | Augsburger et al. |
| 6,633,811 B1 | 10/2003 | Aumayer |
| 6,636,790 B1 | 10/2003 | Lightner |
| 6,639,512 B1 | 10/2003 | Lee |
| 6,643,578 B2 | 11/2003 | Levine |
| 6,651,001 B2 | 11/2003 | Apsell |
| 6,654,862 B2 | 11/2003 | Kane et al. |
| 6,657,540 B2 | 12/2003 | Knapp |
| 6,662,013 B2 | 12/2003 | Takiguchi et al. |
| 6,662,141 B2 | 12/2003 | Kaub |
| 6,664,922 B1 | 12/2003 | Fan |
| 6,665,613 B2 | 12/2003 | Duvall |
| 6,674,362 B2 | 1/2004 | Yoshioka |
| 6,675,085 B2 | 1/2004 | Straub |
| 6,677,854 B2 | 1/2004 | Dix |
| 6,678,612 B1 | 1/2004 | Khawam |
| 6,681,195 B1 | 1/2004 | Poland |
| 6,696,932 B2 | 2/2004 | Skibinski |
| 6,701,234 B1 | 3/2004 | Vogelsang |
| 6,703,925 B2 | 3/2004 | Steffel |
| 6,710,738 B2 | 3/2004 | Allen |
| 6,714,894 B1 | 3/2004 | Tobey et al. |
| 6,718,235 B1 | 4/2004 | Borugian |
| 6,718,239 B2 | 4/2004 | Rayner |
| 6,718,258 B1 | 4/2004 | Barton |
| 6,720,889 B2 | 4/2004 | Yamaki |
| 6,725,460 B1 * | 4/2004 | Nishiyama ......... H04N 7/17336 348/722 |
| 6,727,809 B1 | 4/2004 | Smith |
| 6,728,542 B2 | 4/2004 | Meda |
| 6,728,605 B2 | 4/2004 | Lash |
| 6,732,031 B1 | 5/2004 | Lightner |
| 6,732,032 B1 | 5/2004 | Banet |
| 6,737,962 B2 | 5/2004 | Mayor |
| 6,741,169 B2 | 5/2004 | Magiawala |
| 6,741,170 B2 | 5/2004 | Alrabady |
| 6,745,153 B2 | 6/2004 | White |
| 6,748,322 B1 | 6/2004 | Fernandez |
| 6,750,761 B1 | 6/2004 | Newman |
| 6,750,762 B1 | 6/2004 | Porter |
| 6,756,916 B2 | 6/2004 | Yanai |
| 6,759,952 B2 | 7/2004 | Dunbridge |
| 6,760,659 B1 | 7/2004 | Cowen |
| 6,766,244 B2 | 7/2004 | Obata et al. |
| 6,768,448 B2 | 7/2004 | Farmer |
| 6,775,602 B2 | 8/2004 | Gordon |
| 6,778,068 B2 | 8/2004 | Wolfe |
| 6,778,885 B2 | 8/2004 | Agashe et al. |
| 6,784,793 B2 | 8/2004 | Gagnon |
| 6,784,832 B2 | 8/2004 | Knockeart et al. |
| 6,788,196 B2 | 9/2004 | Ueda |
| 6,788,207 B2 | 9/2004 | Wilkerson |
| 6,792,339 B2 | 9/2004 | Basson |
| 6,795,017 B1 | 9/2004 | Puranik et al. |
| 6,798,354 B2 | 9/2004 | Schuessler |
| 6,803,854 B1 | 10/2004 | Adams et al. |
| 6,807,481 B1 | 10/2004 | Gastelum |
| 6,813,549 B2 | 11/2004 | Good |
| 6,819,236 B2 | 11/2004 | Kawai |
| 6,822,557 B1 | 11/2004 | Weber |
| 6,832,141 B2 | 12/2004 | Skeen et al. |
| 6,845,314 B2 | 1/2005 | Fosseen |
| 6,845,316 B2 | 1/2005 | Yates |
| 6,845,317 B2 | 1/2005 | Craine |
| 6,847,871 B2 | 1/2005 | Malik et al. |
| 6,847,872 B2 | 1/2005 | Bodin |
| 6,847,873 B1 | 1/2005 | Li |
| 6,847,887 B1 | 1/2005 | Casino |
| 6,850,841 B1 | 2/2005 | Casino |
| 6,853,910 B1 | 2/2005 | Oesterling |
| 6,859,039 B2 | 2/2005 | Horle |
| 6,859,695 B2 | 2/2005 | Klausner |
| 6,865,457 B1 | 3/2005 | Mittelstead |
| 6,867,733 B2 | 3/2005 | Sandhu et al. |
| 6,868,386 B1 | 3/2005 | Henderson et al. |
| 6,870,469 B2 | 3/2005 | Ueda |
| 6,873,253 B2 | 3/2005 | Veziris |
| 6,873,261 B2 | 3/2005 | Anthony |
| 6,873,998 B1 | 3/2005 | Dorum et al. |
| 6,877,007 B1 | 4/2005 | Hentzel et al. |
| 6,879,894 B1 | 4/2005 | Lightner |
| 6,885,293 B2 | 4/2005 | Okumura |
| 6,888,495 B2 | 5/2005 | Flick |
| 6,892,131 B2 | 5/2005 | Coffee |
| 6,894,606 B2 | 5/2005 | Forbes et al. |
| 6,894,611 B2 | 5/2005 | Butz et al. |
| 6,895,324 B2 | 5/2005 | Straub |
| 6,895,332 B2 | 5/2005 | King |
| 6,909,398 B2 | 6/2005 | Knockeart et al. |
| 6,909,947 B2 | 6/2005 | Douros et al. |
| 6,914,523 B2 | 7/2005 | Munch |
| 6,922,133 B2 | 7/2005 | Wolfe |
| 6,922,616 B2 | 7/2005 | Obradovich |
| 6,922,622 B2 | 7/2005 | Dulin |
| 6,925,425 B2 | 8/2005 | Remboski |
| 6,928,348 B1 | 8/2005 | Lightner |
| 6,931,309 B2 | 8/2005 | Phelan et al. |
| 6,934,611 B2 | 8/2005 | McKeown et al. |
| 6,937,162 B2 | 8/2005 | Tokitsu |
| 6,950,013 B2 | 9/2005 | Scaman |
| 6,954,140 B2 | 10/2005 | Holler |
| 6,957,133 B1 | 10/2005 | Hunt et al. |
| 6,958,976 B2 | 10/2005 | Kikkawa |
| 6,960,168 B2 | 11/2005 | Yanagidaira et al. |
| 6,965,827 B1 | 11/2005 | Wolfson |
| 6,968,311 B2 | 11/2005 | Knockeart et al. |
| 6,970,075 B2 | 11/2005 | Cherouny |
| 6,970,783 B2 | 11/2005 | Knockeart et al. |
| 6,972,669 B2 | 12/2005 | Saito |
| 6,980,131 B1 | 12/2005 | Taylor |
| 6,981,565 B2 | 1/2006 | Gleacher |
| 6,982,636 B1 | 1/2006 | Bennie |
| 6,983,200 B2 | 1/2006 | Bodin |
| 6,988,033 B1 | 1/2006 | Lowrey |
| 6,988,034 B1 | 1/2006 | Marlatt et al. |
| 6,989,739 B2 | 1/2006 | Li |
| 7,002,454 B1 | 2/2006 | Gustafson |
| 7,002,579 B2 | 2/2006 | Olson |
| 7,005,975 B2 | 2/2006 | Lehner |
| 7,006,820 B1 | 2/2006 | Parker et al. |
| 7,019,641 B1 | 3/2006 | Lakshmanan |
| 7,023,321 B2 | 4/2006 | Brillon et al. |
| 7,023,332 B2 | 4/2006 | Saito |
| 7,024,318 B2 | 4/2006 | Fischer |
| 7,027,808 B2 | 4/2006 | Wesby |
| 7,034,705 B2 | 4/2006 | Yoshioka |
| 7,038,578 B2 | 5/2006 | Will |
| 7,042,347 B2 | 5/2006 | Cherouny |
| 7,047,114 B1 | 5/2006 | Rogers |
| 7,049,941 B2 | 5/2006 | Rivera-Cintron |
| 7,054,742 B2 | 5/2006 | Khavakh et al. |
| 7,059,689 B2 | 6/2006 | Lesesky |
| 7,069,126 B2 | 6/2006 | Bernard |
| 7,069,134 B2 | 6/2006 | Williams |

(56) References Cited

U.S. PATENT DOCUMENTS

| | | |
|---|---|---|
| 7,072,753 B2 | 7/2006 | Eberle |
| 7,081,811 B2 | 7/2006 | Johnston |
| 7,084,755 B1 | 8/2006 | Nord |
| 7,088,225 B2 | 8/2006 | Yoshioka |
| 7,089,116 B2 | 8/2006 | Smith |
| 7,091,880 B2 | 8/2006 | Sorensen |
| 7,098,812 B2 | 8/2006 | Hirota |
| 7,099,750 B2 | 8/2006 | Miyazawa |
| 7,099,774 B2 | 8/2006 | King |
| 7,102,946 B2 | 9/2006 | Ernst |
| 7,109,850 B2 | 9/2006 | Kawazoe et al. |
| 7,109,853 B1 | 9/2006 | Mattson |
| 7,113,081 B1 | 9/2006 | Reichow |
| 7,113,107 B2 | 9/2006 | Taylor |
| 7,113,127 B1 | 9/2006 | Banet et al. |
| 7,117,075 B1 | 10/2006 | Larschan et al. |
| 7,119,696 B2 | 10/2006 | Borugian |
| 7,124,027 B1 | 10/2006 | Ernst |
| 7,124,088 B2 | 10/2006 | Bauer et al. |
| 7,129,825 B2 | 10/2006 | Weber |
| 7,132,934 B2 | 11/2006 | Allison |
| 7,132,937 B2 | 11/2006 | Lu |
| 7,132,938 B2 | 11/2006 | Suzuki |
| 7,133,755 B2 | 11/2006 | Salman |
| 7,135,983 B2 | 11/2006 | Filippov |
| 7,138,916 B2 | 11/2006 | Schwartz |
| 7,139,661 B2 | 11/2006 | Holze |
| 7,142,196 B1 | 11/2006 | Connor et al. |
| 7,145,442 B1 | 12/2006 | Wai |
| 7,149,206 B2 | 12/2006 | Pruzan |
| 7,155,259 B2 | 12/2006 | Bauchot et al. |
| 7,155,321 B2 | 12/2006 | Bromley et al. |
| 7,161,473 B2 | 1/2007 | Hoshal |
| 7,164,986 B2 | 1/2007 | Humphries |
| 7,170,390 B2 | 1/2007 | Quinones |
| 7,170,400 B2 | 1/2007 | Cowelchuk |
| 7,174,243 B1 | 2/2007 | Lightner |
| 7,176,813 B2 | 2/2007 | Kawamata et al. |
| 7,180,407 B1 | 2/2007 | Guo |
| 7,180,409 B2 | 2/2007 | Brey |
| 7,183,942 B2 | 2/2007 | Rock et al. |
| 7,187,271 B2 | 3/2007 | Ngata |
| 7,188,025 B2 | 3/2007 | Hudson, Jr. |
| 7,196,629 B2 | 3/2007 | Ruoss |
| 7,197,500 B1 | 3/2007 | Israni et al. |
| 7,216,022 B2 | 5/2007 | Kynast et al. |
| 7,216,035 B2 | 5/2007 | Hortner |
| 7,222,009 B2 | 5/2007 | Hijikata |
| 7,225,060 B2 | 5/2007 | O'Connor et al. |
| 7,225,065 B1 | 5/2007 | Hunt |
| 7,228,211 B1 | 6/2007 | Lowrey |
| 7,233,235 B2 | 6/2007 | Pavlish |
| 7,236,862 B2 | 6/2007 | Kanno |
| 7,239,948 B2 | 7/2007 | Nimmo |
| 7,256,686 B2 | 8/2007 | Koutsky |
| 7,256,700 B1 | 8/2007 | Ruocco |
| 7,256,702 B2 | 8/2007 | Isaacs |
| 7,260,497 B2 | 8/2007 | Watabe |
| RE39,845 E | 9/2007 | Hasfjord |
| 7,269,507 B2 | 9/2007 | Cayford |
| 7,269,530 B1 | 9/2007 | Lin |
| 7,271,716 B2 | 9/2007 | Nou |
| 7,273,172 B2 | 9/2007 | Olsen |
| 7,280,046 B2 | 10/2007 | Berg |
| 7,281,211 B2 | 10/2007 | Ho |
| 7,283,904 B2 | 10/2007 | Benjamin |
| 7,286,825 B2 | 10/2007 | Shishido |
| 7,286,917 B2 | 10/2007 | Hawkins |
| 7,286,929 B2 | 10/2007 | Staton |
| 7,289,024 B2 | 10/2007 | Sumcad |
| 7,289,035 B2 | 10/2007 | Nathan |
| 7,292,152 B2 | 11/2007 | Torkkola |
| 7,292,159 B2 | 11/2007 | Culpepper |
| 7,295,921 B2 | 11/2007 | Spencer et al. |
| 7,298,248 B2 | 11/2007 | Finley |
| 7,301,445 B2 | 11/2007 | Moughler |
| 7,317,383 B2 | 1/2008 | Ihara |
| 7,317,392 B2 | 1/2008 | DuRocher |
| 7,317,927 B2 | 1/2008 | Staton |
| 7,319,848 B2 | 1/2008 | Obradovich |
| 7,321,294 B2 | 1/2008 | Mizumaki |
| 7,321,825 B2 | 1/2008 | Ranalli |
| 7,323,972 B2 | 1/2008 | Nobusawa |
| 7,323,974 B2 | 1/2008 | Schmid |
| 7,323,982 B2 | 1/2008 | Staton |
| 7,327,239 B2 | 2/2008 | Gallant |
| 7,327,258 B2 | 2/2008 | Fast |
| 7,333,883 B2 | 2/2008 | Geborek |
| 7,339,460 B2 | 3/2008 | Lane |
| 7,349,782 B2 | 3/2008 | Churchill |
| 7,352,081 B2 | 4/2008 | Taurasi |
| 7,355,508 B2 | 4/2008 | Mian |
| 7,362,239 B2 | 4/2008 | Franczyk et al. |
| 7,365,639 B2 | 4/2008 | Yuhara |
| 7,366,551 B1 | 4/2008 | Hartley |
| 7,375,624 B2 | 5/2008 | Hines |
| 7,376,499 B2 | 5/2008 | Salman |
| 7,378,946 B2 | 5/2008 | Lahr |
| 7,378,949 B2 | 5/2008 | Chen |
| 7,386,394 B2 | 6/2008 | Shulman |
| 7,397,363 B2 | 7/2008 | Joao |
| 7,397,365 B2 | 7/2008 | Wang |
| 7,398,153 B2 | 7/2008 | Workman et al. |
| 7,421,334 B2 | 9/2008 | Dahlgren et al. |
| 7,433,889 B1 | 10/2008 | Barton |
| 7,447,509 B2 | 11/2008 | Cossins et al. |
| 7,447,574 B1 | 11/2008 | Washicko et al. |
| 7,474,264 B2 | 1/2009 | Bolduc et al. |
| 7,474,269 B2 | 1/2009 | Mayer et al. |
| 7,495,547 B2 | 2/2009 | Lich et al. |
| 7,499,949 B2 | 3/2009 | Barton |
| 7,565,230 B2 | 7/2009 | Gardner et al. |
| 7,584,033 B2 | 9/2009 | Mittelsteadt et al. |
| 7,589,643 B2 | 9/2009 | Dagei et al. |
| 7,660,658 B2 | 2/2010 | Sheynblat |
| 7,671,727 B2 | 3/2010 | Flick |
| 7,671,752 B2 | 3/2010 | Sofer |
| 7,697,917 B2 | 4/2010 | Camp et al. |
| 7,739,036 B2 | 6/2010 | Grimm et al. |
| 7,747,410 B2 | 6/2010 | Van Esch |
| 7,783,406 B2 | 8/2010 | Rothschild |
| 7,821,421 B2 | 10/2010 | Tamir et al. |
| 7,859,392 B2 | 12/2010 | McClellan |
| 7,880,642 B2 | 2/2011 | Gueziec |
| 7,898,388 B2 | 3/2011 | Ehrman et al. |
| 7,899,610 B2 | 3/2011 | McClellan |
| 7,941,258 B1 | 5/2011 | Mittelsteadt et al. |
| 7,999,670 B2 | 8/2011 | McClellan et al. |
| 8,044,809 B2 | 10/2011 | Farmer |
| 8,090,598 B2 | 1/2012 | Bauer et al. |
| 8,188,887 B2 | 5/2012 | Catten et al. |
| 8,314,708 B2 | 11/2012 | Gunderson et al. |
| 8,350,721 B2 | 1/2013 | Carr |
| 8,428,307 B2 | 4/2013 | Bradai et al. |
| 8,630,768 B2 | 1/2014 | McClellan et al. |
| 8,818,618 B2 | 8/2014 | Follmer et al. |
| 8,890,717 B2 | 11/2014 | McClellan |
| 9,847,021 B2 | 12/2017 | McClellan et al. |
| 2001/0014849 A1 | 8/2001 | King et al. |
| 2001/0018628 A1 | 8/2001 | Jenkins et al. |
| 2001/0048364 A1 | 12/2001 | Kalthoff et al. |
| 2002/0019703 A1 | 2/2002 | Levine |
| 2002/0024444 A1 | 2/2002 | Hiyama et al. |
| 2002/0026334 A1 | 2/2002 | Igoe |
| 2002/0029226 A1 | 3/2002 | Li et al. |
| 2002/0111725 A1 | 8/2002 | Burge |
| 2002/0111844 A1 | 8/2002 | Vanstory et al. |
| 2002/0116228 A1 | 8/2002 | Bauer et al. |
| 2002/0120371 A1 | 8/2002 | Leivian et al. |
| 2002/0126022 A1* | 9/2002 | Ellis ............... A61H 3/061 340/901 |
| 2002/0126023 A1 | 9/2002 | Awada |
| 2002/0128000 A1 | 9/2002 | do Nascimento |
| 2003/0016636 A1 | 1/2003 | Tari et al. |

(56) References Cited

U.S. PATENT DOCUMENTS

| | | |
|---|---|---|
| 2003/0045273 A1 | 3/2003 | Pyhalammi et al. |
| 2003/0055555 A1 | 3/2003 | Knockeart et al. |
| 2003/0060950 A1 | 3/2003 | McKeown et al. |
| 2003/0114966 A1 | 6/2003 | Ferguson et al. |
| 2003/0125854 A1 | 7/2003 | Kawasaki et al. |
| 2003/0134660 A1 | 7/2003 | Himmel et al. |
| 2003/0169185 A1 | 9/2003 | Taylor |
| 2003/0191564 A1 | 10/2003 | Haugse et al. |
| 2004/0039504 A1 | 2/2004 | Coffee et al. |
| 2004/0039609 A1 | 2/2004 | Burkitt |
| 2004/0054687 A1 | 3/2004 | McDonough |
| 2004/0056779 A1 | 3/2004 | Rast |
| 2004/0066330 A1 | 4/2004 | Knockeart et al. |
| 2004/0077339 A1 | 4/2004 | Martens |
| 2004/0083041 A1 | 4/2004 | Skeen et al. |
| 2004/0107037 A1 | 6/2004 | Straub |
| 2004/0107220 A1 | 6/2004 | Natesan et al. |
| 2004/0139034 A1 | 7/2004 | Farmer |
| 2004/0142672 A1 | 7/2004 | Stankewitz |
| 2004/0142678 A1* | 7/2004 | Krasner ............... G08B 25/016 455/404.2 |
| 2004/0153362 A1 | 8/2004 | Bauer et al. |
| 2004/0172418 A1 | 9/2004 | Dorum et al. |
| 2004/0176083 A1 | 9/2004 | Shiao et al. |
| 2004/0186661 A1 | 9/2004 | Barton |
| 2004/0210353 A1 | 10/2004 | Rice |
| 2004/0225557 A1 | 11/2004 | Phelan et al. |
| 2004/0236474 A1 | 11/2004 | Chowdhary et al. |
| 2004/0236475 A1 | 11/2004 | Chowdhary et al. |
| 2004/0236476 A1 | 11/2004 | Chowdhary |
| 2004/0252027 A1 | 12/2004 | Torkkola et al. |
| 2004/0254698 A1 | 12/2004 | Hubbard et al. |
| 2004/0257245 A1 | 12/2004 | Jo |
| 2004/0260579 A1 | 12/2004 | Tremiti |
| 2005/0021270 A1 | 1/2005 | Hong et al. |
| 2005/0030224 A1* | 2/2005 | Koch ................... G01S 5/0027 342/357.31 |
| 2005/0049765 A1 | 3/2005 | Chetia et al. |
| 2005/0064835 A1 | 3/2005 | Gusler |
| 2005/0065711 A1 | 3/2005 | Dahlgren et al. |
| 2005/0070245 A1 | 3/2005 | Nath et al. |
| 2005/0091018 A1 | 4/2005 | Craft |
| 2005/0091175 A9 | 4/2005 | Farmer |
| 2005/0096809 A1 | 5/2005 | Skeen et al. |
| 2005/0102098 A1 | 5/2005 | Montealegre et al. |
| 2005/0107944 A1 | 5/2005 | Hovestadt et al. |
| 2005/0119002 A1 | 6/2005 | Bauchot et al. |
| 2005/0131597 A1 | 6/2005 | Raz et al. |
| 2005/0137757 A1 | 6/2005 | Phelan et al. |
| 2005/0143903 A1 | 6/2005 | Park et al. |
| 2005/0171663 A1 | 8/2005 | Mittelsteadt et al. |
| 2005/0184860 A1 | 8/2005 | Taruki et al. |
| 2005/0264404 A1 | 12/2005 | Franczyk |
| 2005/0273218 A1 | 12/2005 | Breed et al. |
| 2006/0022842 A1 | 2/2006 | Zoladek et al. |
| 2006/0025894 A1 | 2/2006 | Oconnor et al. |
| 2006/0053038 A1 | 3/2006 | Warren et al. |
| 2006/0055561 A1 | 3/2006 | Kamali |
| 2006/0055565 A1 | 3/2006 | Kawamata et al. |
| 2006/0095175 A1* | 5/2006 | deWaal ................. G07C 5/008 701/31.4 |
| 2006/0112573 A1 | 6/2006 | Hillman et al. |
| 2006/0121951 A1 | 6/2006 | Perdomo et al. |
| 2006/0129691 A1 | 6/2006 | Coffee |
| 2006/0154687 A1 | 7/2006 | McDowell |
| 2006/0193749 A1 | 8/2006 | Ghazarian et al. |
| 2006/0208169 A1 | 9/2006 | Breed et al. |
| 2006/0220905 A1 | 10/2006 | Hovestadt |
| 2006/0224306 A1 | 10/2006 | Workman et al. |
| 2006/0234711 A1 | 10/2006 | McArdle |
| 2006/0253307 A1 | 11/2006 | Warren et al. |
| 2006/0265125 A1 | 11/2006 | Glaza |
| 2007/0005240 A1 | 1/2007 | Oumi et al. |
| 2007/0005404 A1 | 1/2007 | Raz et al. |
| 2007/0005609 A1 | 1/2007 | Breed |
| 2007/0027583 A1 | 2/2007 | Tamir et al. |
| 2007/0027726 A1 | 2/2007 | Warren et al. |
| 2007/0050130 A1 | 3/2007 | Grimm et al. |
| 2007/0057781 A1 | 3/2007 | Breed |
| 2007/0061155 A1 | 3/2007 | Ji et al. |
| 2007/0126601 A1 | 6/2007 | Park |
| 2007/0139189 A1 | 6/2007 | Helmig |
| 2007/0162552 A1 | 7/2007 | Shaffer |
| 2007/0186923 A1 | 8/2007 | Poutiatine et al. |
| 2007/0202929 A1 | 8/2007 | Satake |
| 2007/0229234 A1 | 10/2007 | Smith |
| 2007/0236342 A1 | 10/2007 | Hines et al. |
| 2007/0260363 A1 | 11/2007 | Miller |
| 2007/0293206 A1 | 12/2007 | Lund |
| 2008/0023965 A1 | 1/2008 | Cagliari et al. |
| 2008/0027642 A1 | 1/2008 | Winberry et al. |
| 2008/0030316 A1 | 2/2008 | Flick |
| 2008/0040210 A1 | 2/2008 | Hedley |
| 2008/0046274 A1 | 2/2008 | Geelen et al. |
| 2008/0059055 A1 | 3/2008 | Geelen et al. |
| 2008/0064413 A1 | 3/2008 | Breed |
| 2008/0065325 A1 | 3/2008 | Geelen et al. |
| 2008/0082221 A1 | 4/2008 | Nagy |
| 2008/0082225 A1 | 4/2008 | Barrett |
| 2008/0086508 A1 | 4/2008 | Ballew |
| 2008/0120175 A1 | 5/2008 | Doering |
| 2008/0177469 A1 | 7/2008 | Geelen et al. |
| 2008/0221776 A1 | 9/2008 | McClellan |
| 2008/0221787 A1 | 9/2008 | Vavrus |
| 2008/0243558 A1 | 10/2008 | Gupte |
| 2008/0255722 A1 | 10/2008 | McClellan et al. |
| 2008/0255888 A1 | 10/2008 | Berkobin |
| 2008/0262670 A1 | 10/2008 | McClellan et al. |
| 2008/0294690 A1 | 11/2008 | McClellan et al. |
| 2008/0296968 A1 | 12/2008 | Culbert |
| 2008/0319602 A1 | 12/2008 | McClellan et al. |
| 2009/0024273 A1 | 1/2009 | Follmer et al. |
| 2009/0024419 A1 | 1/2009 | McClellan et al. |
| 2009/0076700 A1 | 3/2009 | Radpour |
| 2009/0079555 A1 | 3/2009 | Aguirre De Carcer et al. |
| 2009/0085728 A1 | 4/2009 | Catten |
| 2009/0157249 A1 | 6/2009 | Yang |
| 2010/0030459 A1 | 2/2010 | Geelen et al. |
| 2010/0030586 A1 | 2/2010 | Taylor et al. |
| 2010/0045452 A1 | 2/2010 | Periwal |
| 2010/0130182 A1 | 5/2010 | Rosen |
| 2010/0131189 A1 | 5/2010 | Geelen et al. |
| 2010/0131304 A1 | 5/2010 | Collopy et al. |
| 2010/0134182 A1 | 6/2010 | Kapoor et al. |
| 2010/0201545 A1 | 8/2010 | Narea |
| 2010/0205012 A1 | 8/2010 | McClellan |
| 2010/0207751 A1 | 8/2010 | Follmer et al. |
| 2010/0207787 A1 | 8/2010 | Catten et al. |
| 2010/0265074 A1 | 10/2010 | Namba et al. |
| 2011/0115618 A1 | 5/2011 | Catten |
| 2011/0179080 A1 | 7/2011 | Miyazaki et al. |
| 2012/0144402 A1* | 6/2012 | Preston .................. B60R 25/00 719/313 |
| 2012/0181765 A1 | 7/2012 | Hill et al. |
| 2015/0294565 A1* | 10/2015 | Follmer ................. G06Q 10/10 701/31.5 |
| 2016/0117871 A1 | 4/2016 | McClellan et al. |
| 2018/0367958 A1* | 12/2018 | Dizdarevic ............ H04W 4/70 |

FOREIGN PATENT DOCUMENTS

| | | |
|---|---|---|
| CA | 2631103 | 11/2008 |
| DE | 19700353 | 7/1998 |
| EP | 0843177 | 5/1998 |
| EP | 0921509 | 6/1999 |
| EP | 1811481 | 7/2007 |
| GB | 2434346 | 7/2007 |
| GB | 2454224 | 5/2009 |
| JP | 2004326492 | 11/2004 |
| JP | 2005223791 | 8/2005 |
| JP | 2005250825 | 9/2005 |
| JP | 2007235530 | 9/2007 |
| WO | WO03009175 | 1/2003 |
| WO | WO2004019646 | 3/2004 |

(56) References Cited

FOREIGN PATENT DOCUMENTS

| WO | WO2005003885 | 1/2005 |
|---|---|---|
| WO | WO2005109273 | 11/2005 |
| WO | WO2005109369 | 11/2005 |
| WO | WO2008045320 | 8/2008 |
| WO | WO2008109477 | 9/2008 |
| WO | WO2013033756 | 3/2013 |
| WO | WO2013050548 | 4/2013 |

OTHER PUBLICATIONS

Blanco, "Effects of In-Vehicle Information System (IVIS) Tasks on the Information Processing Demands of a Commercial Vehicle Operations (CVO) Driver", Dec. 1999, 230 pages.
Cho et al., "Observability Analysis of the INS/GPS Navigation System on the Measurements in Land Vehicle Applications", Control, Automation and Systems, 2007, ICCAS '07, International Conference on Digital Object Identifier: 10.1109/CCAS.2007.4407018, Publication Year: Oct. 2007, pp. 841-846.
Huddle et al., "Application of Inertial Navigation Systems to Geodetic Position and Gravity Vector Survey", Decision and Control including the 17th Symposium on Adaptive Processes, 1978 IEEE Conference on; vol. 17, Part 1; Digital Object Identifier: 10.1109/CDC.1978.267967; Publication Year: 1978, pp. 459-465. (The month of Publication is irrelevant since the year of Publication is clearly prior to the filing of the Application).
Google Maps, "Google Maps", Available at least as early as Dec. 29, 2014. Whole Document.
Lupton et al., "Efficient Integration of Inertial Observations Into Visual SLAM Without Initialization", Intelligent Robots and Systems, 2009, IROS 2009, IEEE/RSJ International Conference on: Digital Object Identifier: 10.1109/IROS.2009.5354267, Publication Year: Oct. 2009, pp. 1547-1552.
Mungula et al., "Attitude and Heading System Based on EKF Total State Configuration", Industrial Electronics (ISIE), 2011 IEEE International Symposium on; Digital Object Identifier: 10.1109/ISIE.2011.5984493; Publication Year: Jun. 2011, pp. 2147-2152.
Ogle, et al. "Accuracy of Global Positioning System for Determining Driver Performance Parameters", Transportation Research Record 1818; Paper No. 02-1063; pp. 12-24. Available at least as early as Feb. 2003.
U.S. Appl. No. 13/012,660, filed Jul. 8, 2013, Office Action.
U.S. Appl. No. 12/379,153, filed Aug. 14, 2013, Notice of Allowance.
U.S. Appl. No. 12/975,489, filed Oct. 3, 2013, Office Action.
U.S. Appl. No. 11/805,237, filed Oct. 28, 2013, Notice of Allowance.
U.S. Appl. No. 12/379,083, filed Jan. 3, 2014, Office Action.
U.S. Appl. No. 11/778,178, filed Feb. 6, 2014, Office Action.
U.S. Appl. No. 11/768,056, filed Feb. 6, 2014, Office Action.
U.S. Appl. No. 13/012,660, filed Feb. 13, 2014, Office Action.
U.S. Appl. No. 11/758,444, filed Feb. 21, 2014, Office Action.
U.S. Appl. No. 12/379,153, filed Mar. 17, 2014, Office Action.
U.S. Appl. No. 11/779,178, filed May 27, 2014, Notice of Allowance.
U.S. Appl. No. 13/012,660, filed Jun. 6, 2014, Notice of Allowance.
U.S. Appl. No. 11/755,556, filed Jun. 10, 2014, Office Action.
U.S. Appl. No. 11/758,444, filed Jun. 27, 2014, Office Action.
U.S. Appl. No. 12/975,489, filed Oct. 1, 2014, Notice of Allowance.
U.S. Appl. No. 12/379,153, filed Oct. 6, 2014, Office Action.
U.S. Appl. No. 12/379,153, filed Jan. 9, 2015, Notice of Allowance.
U.S. Appl. No. 12/379,083, filed Mar. 17, 2015, Office Action.
U.S. Appl. No. 11/755,556, filed Mar. 30, 2015 Notice of Allowance.
U.S. Appl. No. 11/758,444, filed Jul. 2, 2015, Office Action.
U.S. Appl. No. 12/379,083, filed Jul. 6, 2015, Notice of Allowance.
U.S. Appl. No. 14/468,961, filed Jul. 17, 2015, Office Action.
U.S. Appl. No. 11/768,056, filed Jul. 21, 2015 Notice of Allowance.
Phuyal B., "An Experiment for a 2-D and 3-D GPS/INS configuration for land vehicle applications", Position Location and Navigation Symposium, 2004, PLANS 2004, Digital Object Identifier: 10.1109/PLANS.2004.1308987; Publication Year: 2004, pp. 148-152. (The month of Publication is irrelevant since the year of Publication is clearly prior to the filing of the Application).
Roberts et al., "Position Control of VTOL UAVs using IMU and GPS Measurements", Decision and Control and European Conference (CDC-ECC), 2011 50th IEEE Conference on, Digital Object Identifier, 10.1109/CDC.2011.6160854, Publication Year: Dec. 2011, pp. 8082-8087.
Shen et al., "A Computer Assistant for Vehicle Dispatching with Learning Capabilities", Annals of Operations Research 61, 1995, pp. 189-211. (The month of Publication is Irrelevant since the year of Publication is clearly prior to the filing of the Application).
Tijerina et al., "Final Report Supplement; Heavy Vehicle Workload Assessment; Task 5; Workload Assessment Protocol", U.S. Department of Transportation, Oct. 1996, 69 pages.
Vukajovic et al., "The Practical Design of In-Vehicle Telematics Device with GPS and MEMS Accelerometers", Telecommunications Forum (TELFOR), 2011 19th: Digital Object Identifier: 10.1109/TELFOR.2011.6143692, Publication Year: Nov. 2011, pp. 908-911.
Zhao Yan et al., "Attitude Measurement of Drivers Head Based on Accelerometer and Magnetoresistive Sensor", Fluid Power and Mechatronics (FPM), 2011 International Conference on; Digital Object Identifier: 1109/FPM.2011.6045836; Publication Year: Aug. 2011, pp. 613-617.
Zhu et al., "A Small Low-Cost Hybrid Orientation system and Its Error Analysis", Sensors Journal, IEEE—vol. 9, Issue 3, Digital Object Identifier: 10.1109/JSEN.2008.2012196; Publication Year: Mar. 2009, pp. 223-230.
U.S. Appl. No. 11/805,238, filed Jul. 30, 2009, Office Action.
U.S. Appl. No. 11/860,594, filed Aug. 6, 2009, Office Action.
U.S. Appl. No. 11/755,556, filed Sep. 1, 2009, Office Action.
U.S. Appl. No. 11/779,176, filed Mar. 17, 2010, Office Action.
U.S. Appl. No. 11/805,238, filed Apr. 26, 2010, Notice of Allowance.
U.S. Appl. No. 11/755,556, filed May 4, 2010, Office Action.
U.S. Appl. No. 11/860,594, filed May 27, 2010, Office Action.
U.S. Appl. No. 11/758,444, filed Jul. 20, 2010, Office Action.
U.S. Appl. No. 11/805,237, filed Nov. 8, 2010, Office Action.
U.S. Appl. No. 11/860,594, filed Nov. 23, 2010, Notice of Allowance.
U.S. Appl. No. 11/768,056, filed Jan. 18, 2011, Office Action.
U.S. Appl. No. 13/012,660, filed Feb. 16, 2011, Office Action.
U.S. Appl. No. 11/758,444, filed Mar. 30, 2011, Office Action.
U.S. Appl. No. 12/379,083, filed Apr. 8, 2011, Office Action.
U.S. Appl. No. 12/379,153, filed Jul. 29, 2011, Office Action.
U.S. Appl. No. 12/379,154, filed Aug. 1, 2011, Office Action.
U.S. Appl. No. 11/805,237, filed Aug. 8, 2011, Office Action.
U.S. Appl. No. 11/779,176, filed Aug. 18, 2011, Office Action.
U.S. Appl. No. 11/768,056, filed Sep. 16, 2011, Office Action.
U.S. Appl. No. 11/779,178, filed Nov. 2, 2011, Office Action.
U.S. Appl. No. 13/012,660, filed Nov. 14, 2011, Office Action.
U.S. Appl. No. 12/379,083, filed Nov. 23, 2011, Office Action.
U.S. Appl. No. 12/379,153, filed Dec. 16, 2011, Office Action.
U.S. Appl. No. 12/379,154, filed Jan. 30, 2012, Notice of Allowance.
U.S. Appl. No. 11/805,237, filed Feb. 1, 2012, Office Action.
U.S. Appl. No. 12/379,083, filed Feb. 2, 2012, Office Action.
U.S. Appl. No. 11/768,056, filed Feb. 16, 2012, Office Action.
U.S. Appl. No. 13/012,660, filed Apr. 11, 2012, Office Action.
U.S. Appl. No. 11/779,178, filed May 31, 2012, Office Action.
U.S. Appl. No. 11/805,237, filed Jun. 15, 2012, Office Action.
U.S. Appl. No. 11/768,056, filed Jul. 19, 2012, Office Action.
U.S. Appl. No. 12/379,153, filed Jul. 31, 2012, Notice of Allowance.
U.S. Appl. No. 13/012,660, filed Aug. 1, 2012, Office Action.
U.S. Appl. No. 13/012,660, filed Nov. 26, 2012, Office Action.
U.S. Appl. No. 11/805,237, filed Dec. 3, 2012, Office Action.
U.S. Appl. No. 11/779,176, filed Dec. 3, 2012, Office Action.
U.S. Appl. No. 11/779,178, filed Dec. 20, 2012, Office Action.
U.S. Appl. No. 13/012,660, filed Mar. 18, 2013, Office Action.
U.S. Appl. No. 11/779,178, filed May 9, 2013, Office Action.
U.S. Appl. No. 12/379,083, filed May 23, 2013, Office Action.
U.S. Appl. No. 11/805,237, filed Jun. 6, 2013, Office Action.

(56) References Cited

OTHER PUBLICATIONS

U.S. Appl. No. 11/768,056, filed Jun. 21, 2013, Office Action.
U.S. Appl. No. 11/779,176, filed Jul. 1, 2013, Notice of Allowance.

* cited by examiner

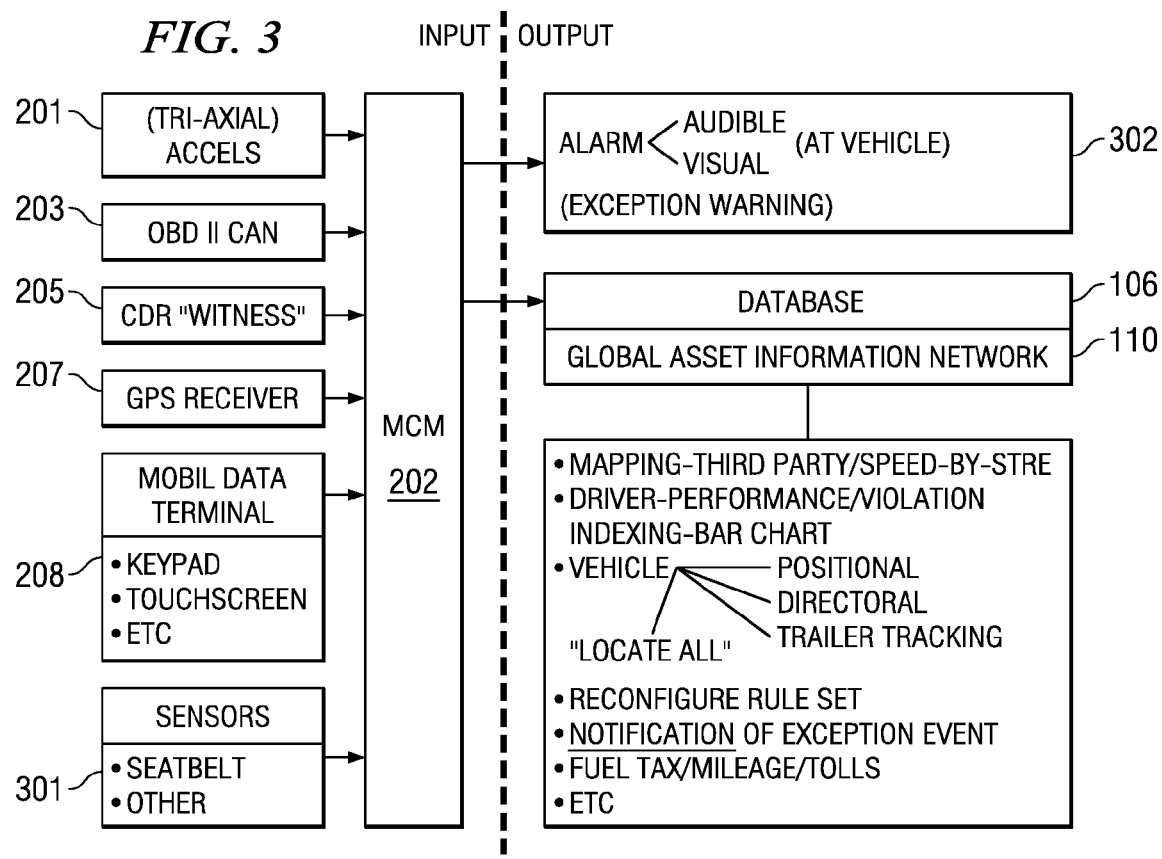
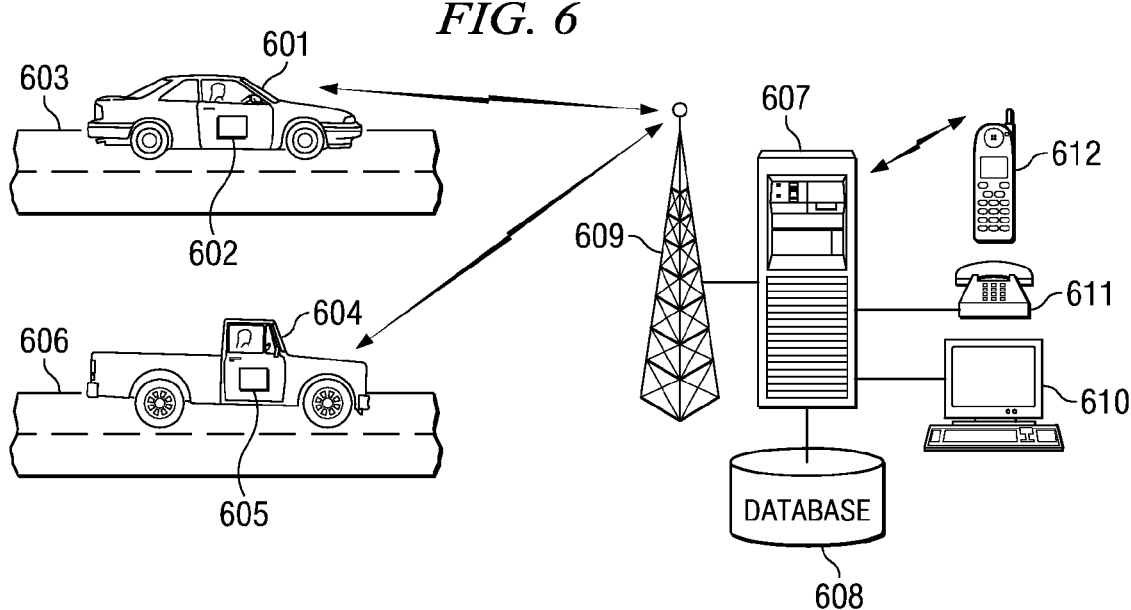

VEHICLE MONITORING DEVICES AND METHODS FOR MANAGING MAN DOWN SIGNALS

CROSS-REFERENCE TO RELATED APPLICATIONS

This application is a continuation of U.S. patent application Ser. No. 14/516,876 filed on Oct. 17, 2014, entitled "System and Method for Monitoring and Updating Speed-By-Street Data," which is a continuation of U.S. patent application Ser. No. 12/975,489 filed on Dec. 22, 2010, entitled "System and Method for Monitoring and Updating Speed-By-Street Data," which issued as U.S. Pat. No. 8,890,717 on Nov. 18, 2014, and which is a continuation of U.S. application Ser. No. 11/805,238 filed May 22, 2007, entitled "System and Method for Monitoring and Updating Speed-by-Street Data," which claims the benefit of U.S. Provisional Application No. 60/802,478, filed on May 22, 2006, entitled "Driver Behavior Monitoring System," each of which application is hereby incorporated herein by reference in its entirety for all purposes.

BACKGROUND OF THE INVENTION

1. The Field of the Invention

The present invention relates generally to a system and method for monitoring driver behavior and vehicle driving conditions and, more particularly, to a system and method for comparing driving speed to a speed-by-street database to identify speeding violations and/or errors in the speed-by-street database.

2. Background

The present invention relates generally to asset management and, more particularly, to a fleet management system incorporating comprehensive driver monitoring/mentoring and asset monitoring capabilities in order to improve driver safety and reduce fuel and maintenance costs across a fleet of vehicles. Advantageously, the fleet management system is fully-configurable at all times including during installation of the system as well as during operation thereof. In addition, the present invention relates to a system and method for monitoring driver behavior for use by consumers or the general public such that parents may remotely mentor the driving habits of their teen children as well as allow for monitoring of geographic areas into which their children may enter. Also, the present invention provides a means for recording impulse forces experienced by a vehicle during a crash event in order to provide real-time notification to fleet management personnel as well as to provide data which may facilitate accident reconstruction and which may be used in the courtroom and by the auto insurance industry.

A recent study released by the Federal Motor Carrier Safety Administration (FMCSA) indicated that driver error was ten times more likely to be the cause of truck-related accidents as compared to other factors such as poor road conditions, weather and mechanical malfunctions. Specifically, the study indicated that certain driver factors such as speeding, inattention, fatigue and unfamiliarity with roads accounted for 88 percent of all crashes involving large trucks. As a means to reduce truck-related accidents, the FMCSA study recommended that greater attention be focused on developing systems for monitoring at-risk driver behavior in commercial motor vehicle fleets in order to improve driver safety.

Losses as a result of accidents involving large truck crashes includes property damage to vehicle and structures as well as personal injury to drivers, occupants and occasionally bystanders. In addition to the financial losses and injuries resulting from truck crashes, fleet operators incur losses as a result of excess fuel and maintenance costs, as well as losses due to inefficient management of individual vehicles in the fleet as well as groups of fleet vehicles such as those located in a specific geographic area. Fleet operators may also suffer losses as a result of vehicle theft, inefficient vehicle routing as a result of unforeseen adverse road conditions along a route, and human losses such as may occur when the driver is injured while performing extravehicular duties.

Included in the prior art are several systems which attempt to address either the problem of driver error as a cause of accidents or by attempting to reduce losses due to inefficient fleet management. For example, U.S. Patent Publication No. 2004/0039504 assigned to Fleet Management Services, Inc., discloses a fleet management information system for identifying the location and direction of movement of each vehicle in the fleet. The Fleet Management Services application discloses that each vehicle in the fleet is in communication directly with management offices in real-time to report vehicle location and heading as well as the status of certain events in which the vehicle may be engaged.

One of the stated objects of the fleet management system disclosed in the application is to improve the availability of fleet management information to owners and operators so as to improve vehicle tracking and enhanced communication within the fleet to increase asset profitability. The application indicates that the above-mentioned objects are facilitated by providing the capability to locate vehicles in the fleet in real-time as well as improving the efficiency of wireless communication within the fleet.

Although the application assigned to Fleet Management Services, Inc., as disclosed above is understood to provide improved fleet business management by minimizing gap times in time division multiple access (TDMA) networks during data transmissions, the application is not understood to address the issue of monitoring driver behavior and/or driver performance in order to improve driver safety and asset health. Furthermore, the application disclosed above is not understood to improve other aspects of fleet operation such as improving fuel economy and reducing maintenance costs of a fleet. In this regard, the application is only understood to improve communication within the fleet and is not understood to improve the amount of information available regarding the operation of each vehicle such that analysis of similar problems may be performed in order to establish trends and ultimately correct problems over time.

U.S. Pat. No. 6,124,810 issued to Segal et al. and assigned to Qualcomm, Inc. discloses a method for determining when a vehicle has arrived and departed from a specific location. More particularly, the Segal patent discloses an apparatus having an on-board mobile communication terminal for receiving destination information wirelessly from a central facility. The apparatus incorporates velocity data from a vehicle speedometer in combination with a communication satellite system in order to provide vehicle position data to a processor.

The processor, located on-board the vehicle, uses speed and position data to determine the vehicle arrival or departure times which is wireless transmitted to the central facility. Although the device of the Segal patent is understood to improve fleet efficiency due to its autonomous transmission of arrival and departure times between a vehicle and a dispatch center, the Segal patent is not understood to address the issue of reducing aggressive driver behavior such as reducing speeding which would improve fleet safety.

U.S. Pat. No. 5,638,077 issued to Martin and assigned to Rockwell International Corporation discloses a fleet management that transmits vehicle positional data to a base station with a time annotation. The positional data further includes velocity data as well as the identity of satellites observed. In this manner, the fleet management system of the Martin reference ostensibly improves fleet management capability by improving the accuracy of GPS positional and directional information. However, the device fails to address the above-noted problems associated with improving driver behavior in fleet operations in order to reduce accident rates and lower fleet operation costs.

BRIEF SUMMARY

As can be seen, there exists a need in the art for a driver mentoring system adaptable for use in commercial fleet operations that monitors at risk and/or unsafe driver behavior and provides mentoring to the driver in order to reduce adverse driver actions and inactions that may lead to accidents. In addition, there exists a need in the art for a driver mentoring system that allows for accurate vehicle tracking at a base station and which can incorporate a third party mapping database in order to provide maximum road speed data for any particular location on a road such that the driver may avoid speeding violations and/or maintain safe, legal, and established speed limits.

Furthermore, there exists a need in the art for a vehicle behavior monitoring system that records velocity and acceleration impulse forces imposed on a vehicle during a crash for use in accident reconstruction for insurance claim and courtroom purposes. Finally, there exists a need in the art for a vehicle behavior monitoring system that provides for real-time reconfiguration of driver performance and vehicle operation parameters from a base station to individual vehicles in a fleet and which allows for reporting of such data in order to generate driver profiles and trends, calculate fuel and mileage tax and create hours of service reports in compliance with federal requirements.

The present invention specifically addresses the above-mentioned needs associated with fleet management by providing a unique vehicle monitoring system specifically adapted to mentor driver performance in order to improve driver safety and reduce accident rates as well as reduce fuel and maintenance costs (as a secondary benefit to good driving behavior—driving the speed limit on paved roads and driving specified and/or configured speed limits on non-paved roads).

In another aspect of the invention, the vehicle monitoring system allows for the recording of crash impulse forces acting on the vehicle during an accident for accident reconstruction purposes and for insurance and injury claim purposes. Fleet utilization is improved by real-time or over-time tracking by GPS of all vehicles in the fleet or tracking per geographic zone, by group, and individually.

The present invention also generates automated International Fuel Tax Agreement (IFTA) reports, mileage reports, hours-of-service (HOS) reports required by the Department of Transportation (DOT) and provides real-time updates on driver behavior and vehicle operation that is accessible anywhere via the internet. Advantageously, the system is fully-configurable in all aspects and at any time including reconfiguring during installation of the system as well as during operation. For example, the invention provides a means by which fleet management can reconfigure the vehicle monitoring system by remote command in order to revise various system parameters such as the type of data to be reported and how often. Conversely, the system can be reconfigured at the vehicle in a comprehensive manner.

Two-way communication between the fleet vehicles and the base station or server allows for notification of fleet management and/or safety personnel during an emergency, during an exception event such as excessive speeding or swerving by a driver, or to allow drivers to report in at specific intervals and times or upon the occurrence of specific events.

BRIEF DESCRIPTION OF THE DRAWINGS

These and other features and advantages of the various embodiments disclosed herein will be better understood with respect to the following description and drawings wherein:

FIG. 3 is an illustration of exemplary inputs that may be provided to the MCM from the vehicle such as by an on-board diagnostic (OBD) system as well as inputs provided by the GPS receiver, the CDR, XL module, MDT and other sensors/devices and which may result in outputs from the MCM such as transmission of data to the DCS and generation of an alarm for the driver;

FIG. 6 illustrates a vehicle monitoring system according to one embodiment of the present invention;

DETAILED DESCRIPTION

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
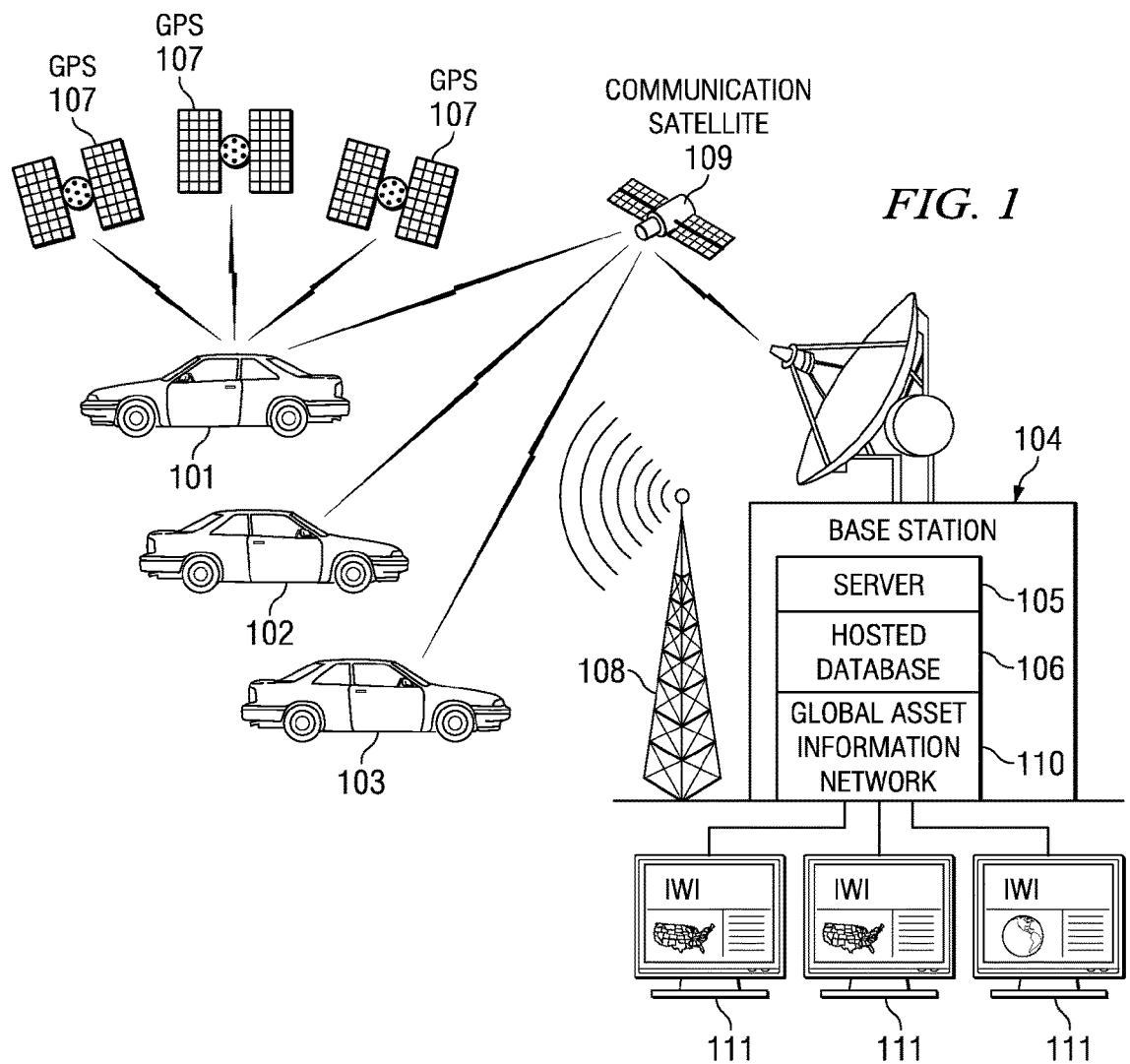
FIG. 1 is an illustration of several GPS-tracked vehicles in wireless communication with a base station having a server containing a fleet management data collection system (DCS) that is also accessible via the internet.

Referring now to the drawings wherein the showings are for purposes of illustrating preferred embodiments of the present invention and not for purposes of limiting the same, shown in FIG. 1 are several vehicles 101-103 of a fleet which are in wireless communication with a base station 104. Each of the vehicles 101-103 in the fleet preferably includes a Global Positioning System (GPS) receiver to allow tracking thereof. The base station 104 includes a server 105 containing a fleet management database 106 or data collection system (DCS) that may be accessible via a securable internet connection or at the server 105 itself.

Figure 2:
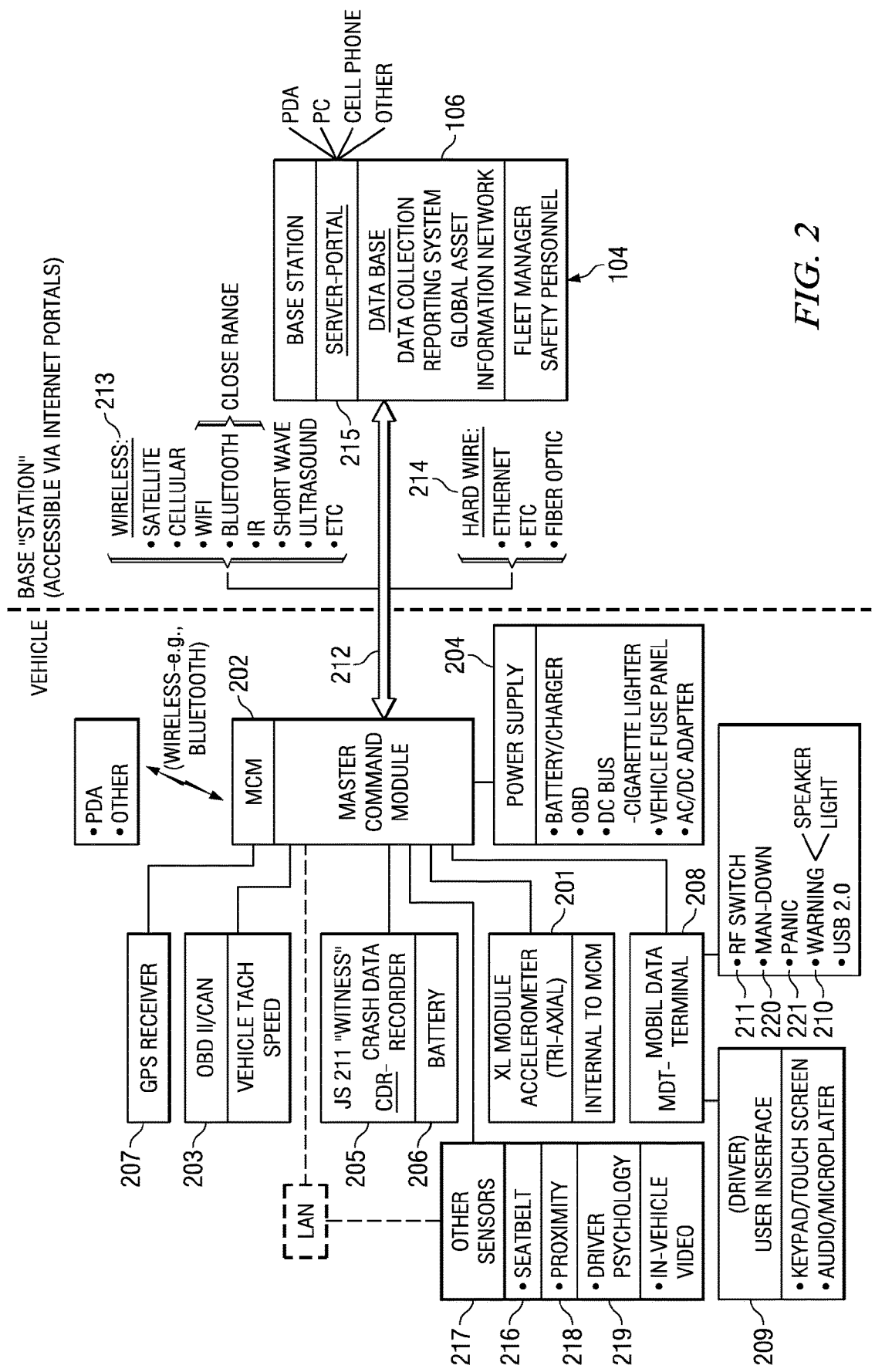
FIG. 2 is a block diagram of a vehicle monitoring system wherein each vehicle may include a GPS receiver (GPS), crash data recorder (CDR), mobile data terminal (MDT), accelerometer module (XL module) and a master command module (MCM) adapted to receive inputs therefrom for transmission to the base station for recording on the DCS and generating reports.

In one aspect of the invention, a vehicle monitoring system is provided for monitoring at least one vehicle 101-103 in the fleet as well as monitoring driver behavior in order to improve safety and reduce fuel and maintenance costs for the fleet. Driver behavior is monitored with the aid of an accelerometer module (XLM) 201 (FIG. 2) which includes at least one accelerometer for measuring at least one of lateral (sideways), longitudinal (forward and aft) and vertical acceleration in order to determine whether the driver is operating the vehicle 101-103 in an unsafe or aggressive manner.

For example, excessive lateral acceleration may be an indication that the driver is operating the vehicle 101-103 at an excessive speed around a turn along a roadway. Furthermore, it is possible that the driver may be traveling at a speed well within the posted speed limit for that area of roadway. However, excessive lateral acceleration, defined herein as "hard turns," may be indicative of aggressive driving by the driver and may contribute to excessive wear on tires and steering components as well as potentially causing the load such as a trailer to shift and potentially overturn.

Furthermore, such hard turns by a particular driver could eventually result in personal injury to the driver/occupants as well as property damage to the vehicle 101-103 and load carried thereby and damage to anything impacted by the vehicle 101-103 should it depart the roadway. Ultimately, such hard turns could result in loss of life if the vehicle is a large truck and the driver loses control resulting in a collision with a smaller vehicle such as a passenger automobile.

As such, it can be seen that monitoring and mentoring such driver behavior by providing warnings to the driver during the occurrence of aggressive driving such as hard turns can improve safety and reduce accidents. In addition, mentoring such aggressive driver behavior can reduce wear and tear on the vehicle and ultimately reduce fleet maintenance costs as well as reduce insurance costs and identify at risk drivers and driving behavior to fleet managers.

In one aspect, the vehicle monitoring system includes a master command module (MCM) 202 which may be in data communication with an on board diagnostic (OBD) II system 203 of the vehicle such as via a port. In some vehicle models, the MCM 202 is placed in data communication with a controller area network (CAN) system (bus) 203 to allow acquisition by the MCM of certain vehicle operating parameters including, but not limited to, vehicle speed such as via the speedometer, engine speed or throttle position such as via the tachometer, mileage such as via the odometer reading, seat belt status, condition of various vehicle systems including anti-lock-braking (ABS), turn signal, headlight, cruise control activation and a multitude of various other diagnostic parameters such as engine temperature, brake wear, etc.

The OBD or CAN 203 allows for acquisition of the above-mentioned vehicle parameters by the MCM 202 for processing thereby and/or for subsequent transmission to the database 106. In order to enhance reliability and extend its useful life, it is contemplated that the MCM 202 is housed in a sealable housing which may be configured to provide varying degrees of waterproof protection. For operation in extreme temperatures, a heater mechanism may be provided to the housing to enable reliable operation in cold and severe service environments. Ideally, the housing contents (e.g., MCM 202) or the housing itself is configured to withstand excessive vibration and/or shock. The MCM 202 may be mounted in any location in the vehicle such as underneath the seat. The MCM 202 may further include an external power source 204 such as a battery, fuel cell, recharger, AC/DC adapter, DC bus—accessory or cigarette lighter plug, hot lead to vehicle fuse panel, etc., for powering the MCM 202.

The vehicle monitoring system may further include a self-contained and tamper-resistant event data recorder or crash data recorder (CDR) 205 similar to that which is shown and disclosed in U.S. Pat. Nos. 6,266,588 and 6,549,834 issued to McClellan et al., (the disclosures of which are hereby incorporated by reference herein in their entirety) and which is commercially known as "Witness" and commercially available from Independent Witness, Inc. of Salt Lake City, Utah. The CDR 205 is adapted to continuously monitor vehicle motion and begin recording upon suprathreshold impacts whereupon it records the magnitude and direction of accelerations or G-forces experienced by the vehicle as well as recording an acceleration time-history of the impact event and velocity change between pre- and post-impact for a configurable duration following said impact. The recordings are time-date stamped and are providable to the MCM 202 for subsequent transmission to the server DCS 106 if accelerations exceed an impulse threshold.

In addition, the CDR 205 is configured such that data is downloadable such as via a laptop directly from the CDR 205 at the scene of the accident or the CDR itself can be removed from the vehicle for later downloading of data. As will be described in greater detail below, the data (e.g., crash impulses) recorded by the CDR 205 can be correlated to accident severity and injury potential. It is contemplated that CDR data can be combined with recording of driver behavior via the accelerometer module (XLM) 201 in order to determine the probability of crash impact as a cause of personal injury and/or property damage.

Furthermore, the CDR 205 such as that disclosed in the McClellan references is Society of Automotive Engineers (SAE) J211-compliant such that data recorded thereby is admissible in court and can be used to facilitate accident reconstruction as well as for insurance claim purposes. As was earlier mentioned, the CDR 205 is a self-contained component that includes its own power source such as a battery 206 such that the vehicle can operate regardless of the lack of power from the vehicle due to the accident.

Importantly, the XLM 201 may be integrated with the MCM 202 and mounted within the housing. The XLM 201 is operative to monitor driver performance by measuring vehicle acceleration in at least one of lateral, longitudinal and vertical directions over a predetermined time period such as over seconds or minutes. The XLM 201 may include a single uni-axial accelerometer to measure acceleration in any one of the three above-mentioned directions such as in the lateral direction.

Alternatively, the accelerometer may be a bi-axial or a tri-axial accelerometer for measuring acceleration in two or three of the above-mentioned directions or two or three uni-axial accelerometers may be combined to provide measurements. In addition, accelerometers may be oriented in the XLM 201 to measure centripetal, centrifugal, radial, tangential acceleration or acceleration in any other direction. The XLM 201 generates an input signal to the MCM 202 when measured acceleration exceeds a predetermined threshold. Similarly, the XLM 201 may be configured to monitor and record both the day-to-day driving performance as well as capture the crash pulse. Advantageously, the base station and/or MCM 202 is configured to filter out or compensate for gravitational effects on longitudinal, lateral and vertical acceleration measurements when the vehicle is moving on hilly terrain.

As was earlier noted, the vehicle monitoring system includes a GPS receiver 207 in each vehicle in the fleet and which is configured to track in at least one of real-time or over-time modes the location and directional movement of the vehicle. As is well known in the art, signals from at least three GPS satellites 107 (FIG. 1) must be received by a GPS receiver 207 in order to calculate the latitude and longitude of an asset such as a vehicle as well as allowing for tracking of vehicle movement by inferring speed and direction from positional changes. Signals from a fourth GPS satellite 107 allow for calculating the elevation and, hence, vertical movement, of the vehicle. The GPS receiver 207 provides a GPS signal to the MCM 201 which may also be transmitted to the server 105 at the base station 104 for recording into the DCS 106.

The vehicle monitoring system may further include a mobile data terminal (MDT) 208 which may be conveniently mounted for observation and manipulation by the driver such as near the vehicle dash. The MDT 208 preferably has an operator interface 209 such as a keypad, keyboard, touch screen, display screen or any suitable user input device and may further include audio input capability such as a microphone to allow voice communications. Importantly, the MDT 208 may include at least one warning mechanism 210 such as an external speaker and/or a warning light 210 for warning the driver of violation of posted speed limits and/or exceeding acceleration thresholds in lateral, longitudinal and vertical directions as an indication of hard turns, hard braking or hard vertical, respectively. In addition, the MDT 208 may include a manual RF disable switch 211 to prevent RF emissions by the vehicle monitoring system in areas that are sensitive to RF energy.

As was earlier mentioned, the MCM 202 is adapted to receive input signals from the OBD or CAN 203, GPS receiver 207, CDR 205, MDT 208 and XLM 201 and, in this regard, may be hardwired such as to the OBD 203 and XLM 201. Alternatively, because of the small distances between the components installed in the vehicle, short range wireless methods such as infrared, ultrasonic, Bluetooth, and other mediums which may link such components. Regardless of the manner of interconnection (wireless or hardwired), the MCM 202 is operative to transmit to the base station 104 an output signal 212 representative of the measured parameters provided by each component according to a rule set or logic contained within the MCM 202.

Alternatively, the logic may be entirely contained in the database 106 at the server 105 such that all processing is performed at the base station 104 and the appropriate signals transmitted back to the MCM 202. In the latter scheme, the MCM 202 and base station 104 must preferably be in continuous two-way wireless communication which, at the time of this writing, is typically not cost-effective for most fleet operators. Therefore, wireless communication between the MCM 202 and the base station 104 is based on a protocol of information criticality, cost and system availability.

For example, in emergency situations wherein the base station 104 receives a signal from the MCM 202 associated with critical data such as an emergency, signal transmission is by the most expedient and reliable means available with cost being a secondary or tertiary consideration. On the other hand, for non-critical data such as an indication of low tire pressure as provided to the MCM 202 by the OBD 203, notification is transmitted to the base station 104 by the least expensive means and during a latent transmission.

Wireless communication 213 between the MCM 202 and the base station 104 may be provided by a variety of systems including, but not limited to, WiFi, cellular network 108, satellite 109, Bluetooth, infrared, ultrasound, short wave, microwave or any other suitable method. Hardwired communication 214 may be effected at close range such as when the vehicle is within a service yard or at a base station wherein an ethernet connection may suffice.

The DCS 106 is an asset information network that is accessible through at least one server portal 215 and is configured to receive data from the MCM 202 during predetermined time intervals, on demand, during critical events, or randomly. The DCS 106 is also configured to generate reports such as graphic report (e.g., bar charts) of driver performance. The DCS 106 can also be configured to cause the MCM 202 to transmit warning signals to the vehicle during driver violations such as speeding, hard turns, hard brake, hard vertical, seatbelt violation and can also be configured to send a notification to the server 105 during predetermined events such as panic, man down, exception, accident, unauthorized vehicle movement to alert fleet management or safety personnel.

The vehicle monitoring system is configured to monitor driver speed using OBD 203 data such as speedometer, odometer, tachometer data or speed inferred from GPS data. Speeding violations may be determined by comparing vehicle speed (as provided by the OBD 203 or as inferred from GPS data) to a speed-by-street database such as a generic third-party data set similar to that commercially available from NAVTEQ of Chicago, Ill., and generating a driver violation when the vehicle speed exceeds the speed-by-street. The driver violation causes the MCM 202 to generate an audible/visual warning to the driver in order to change driver behavior over time. In this manner, the vehicle monitoring system provides for mentoring of driver behavior in order to improve safety and reduce fleet management costs.

Furthermore, the MCM 202 may be configured to determine vehicle speed such as during a turn where the vehicle is moving slower than the speed limit but the lateral acceleration levels as measured by the XLM 201 exceed the threshold values. Such a situation may occur when the driver is turning aggressively in a parking lot (i.e., hard turning). By integrating lateral acceleration over time, it is possible to determine instantaneous velocity of the vehicle at any point in the turn. Importantly, in one aspect of the invention, the generation of the warning signal to the driver starts a count-down timer wherein the vehicle monitoring system transmits an exception signal to the base station when the timer duration expires.

Alternatively, an exception signal may be generated when certain measured parameters exceed a threshold value by a large margin such as when the magnitude of the speeding violation exceeds a threshold of 100 mph. An exception signal may then be transmitted to the base station 104 such that appropriate fleet management personnel may be alerted. Such notification may be by any predetermined means and may include cell phone voice or text communication, paging, etc. In addition to the warning signal at the vehicle, the driver may likewise be contacted by cell phone, page or other radio communications regarding the exception event.

The MCM 202 may be in receipt of numerous other sensors that may provide indication of driver violations. For example, the vehicle monitoring system may include a seat sensor 216 in communication with the MCM 202 and which is operative to generate a signal when the vehicle is moving and seatbelts of vehicle occupants are unfastened. In this regard, the vehicle monitoring system may include any number of mechanical and electronic sensors 217 in data communication with the MCM and which are configured to monitor at least one of the following vehicle parameters: low battery, engine temperature, ignition on/off, headlight turn indicator usage, ABS operability, trailer electrical/mechanical malfunction, proximity forward (tailgating) and proximity rearward (objects behind) and proximity sideways (swerving and lane departures) 218. Furthermore, mechanical and electronic sensors 219 may be provided to monitor at least one of the following driver parameters: blink rate (a sleep sensor), heart rate, blood pressure and any other physiological parameters.

The vehicle monitoring system may be operative to track and generate on-demand reports of hours-of-service (HOS) (e.g., on-duty/off-duty driving times, consecutive driving days) in compliance with Federal Motor Carrier Safety Administration regulations. The vehicle monitoring system may additionally be operative to facilitate apportionment of mileage tax by tracking vehicle mileage within a given geographic region by noting state and national border crossings. In another aspect of the invention, it is contemplated that correction for mileage errors can be compensated for by re-synchronizing the MCM 202.

More specifically, because of the drift in OBD 203 mileage data due to odometer error as a result of tire wear or variations in tire pressure and/or due to inconsistencies in the GPS receiver data as a result of multi-path errors due to interference with trees and buildings or signal delay errors caused by atmospheric interference, the present invention may include a process for re-synchronizing the MCM 202 during vehicle refueling. In this manner, fuel tax may be accurately tracked in order to reduce fleet fuel costs.

The MCM 202 may automatically send certain types of signals to the base station 104. For example, the vehicle monitoring system may further include a manually/automatically-activatable timer that is configured to generate a man down signal 220 that is sent to the base station when the timer duration is exceeded. For example, in remote job site locations such as at an oil well location where it is necessary for the driver to perform certain hazardous tasks outside of the vehicle, the driver may first activate a one-hour (or other duration) timer such that failure to deactivate the timer results in a man down signal being transmitted to the base station 104 so that help may be sent to the vehicle location. A similar message may be sent to the base station 104 via a panic button 221 activated by a driver, occupant or any nearby person and may operate similar to that of a fire alarm or emergency 9-1-1 phone call wherein fleet management may send help to the vehicle location.

As was earlier mentioned, the MCM 202 may be configured to send to the base station 104 an exception signal representative of a violation of one of a plurality of parameters comprising at least one of exceeding a predetermined speed along a given route, failure to wear seatbelt, failure to activate headlights, tailgating, excessive idle time, excessive engine RPM, engine parameters, tire condition, vehicle load condition, vehicle location violation. The parameter settings (i.e., logic) of the MCM 202 may be remotely changed by commands transmitted from the base station 104 to the MCM 202. More specifically, the rule sets that comprise the hierarchy (i.e., criticality) by which signals are transmitted from the MCM 202 to the base station 104 may be revised. For example, a hierarchy of signal transmission may be revised from: panic, man down, crash event, exception, non-urgent communication to a hierarchy of crash event, man down, panic, exception, non-urgent communication.

In this same regard, the MCM 202 in one aspect of the invention is configured to allow for wireless or remote manipulation from the base station 104 of vehicle settings through the OBD or CAN 203 and may allow for revising certain vehicle settings such as engine governor setting and ignition timing. In a further aspect, the vehicle monitoring system allows for generating reports or alerts (e.g., text and/or map) of recently-occurring accident locations and dangerous road conditions such that a warning signal may be provided to the driver when the vehicle approaches the accident location or road condition. Additionally, the system can be configured to geo-fence certain areas of interest and to notify specified and/or targeted individuals when the vehicle and its driver approaches or departs a geo-fenced area. As was earlier mentioned, the database 106 is configured to collect driver performance data over time, generate a driver performance database comprising vehicle type and driver profile, and generate reports of predictive driver behavior based on historical driver performance data with the option of generating a graphical representation such as a bar chart of driver performance.

Additional modifications and improvements of the present invention may also be apparent to those of ordinary skill in the art. Thus, the particular combination of parts described and illustrated herein is intended to represent only one embodiment of the present invention and is not intended to serve as limitations of alternative devices within the spirit and scope of the present invention.

Global Asset Information Network (GAIN) 110 (FIG. 1) is a portal for fleet asset management and for monitoring driver safety. GAIN is a robust data collection and reporting system. Using an internet browser 111, fleet managers have a view into their fleet's current status. They can see all pertinent aspects of fleet operations from complex indexing and trending of aggressive driver behavior to simple location of the entire fleet. Fleet managers and safety managers can use the GAIN portal to access the information reported by the vehicle monitoring equipment. Vehicles collect the data and report in at specific times, such as a preselected interval, at random intervals, when requested, by exception, or in an emergency. Vehicles report to GAIN via satellite 109, cellular network 108, or other communications device to database 106. GAIN turns the data into actionable information providing visual reports at various levels of aggregation. The GAIN system 110 can be set to notify managers when emergencies such as panic, man down, accidents, unauthorized vehicle movement (theft) or other company selected events occur.

FIG. 3 is an illustration of exemplary inputs that may be provided to the MCM 202 from the vehicle and which may result in outputs from the MCM 202. OBD II/CAN 203 collects data from the vehicle's on-board diagnostic system, including engine performance data and system status information. GPS receiver 207 provides location information. CDR 205 provides data in the event that a crash threshold is exceeded. Accelerometers 201 provide information regarding the vehicle's movement and driving conditions. The user may provide information to MCM 202 via the mobile data terminal 208. Any number of other sensors 301, such as seat belt sensor 216, proximity sensor 218, driver monitoring sensors 219, or cellular phone use sensors, also provide inputs to MCM 202.

MCM 202 can determine when an exception condition occurs or when a threshold is exceeded that requires an alarm 302 to be generated in the vehicle. The alarm 302 may be an audible or visual warning for the vehicle occupants. Additionally, any of the data collected may be passed on to database 106 at server 105 where it may be further processed or accessed by fleet managers via GAIN system 110.

Figure 4:
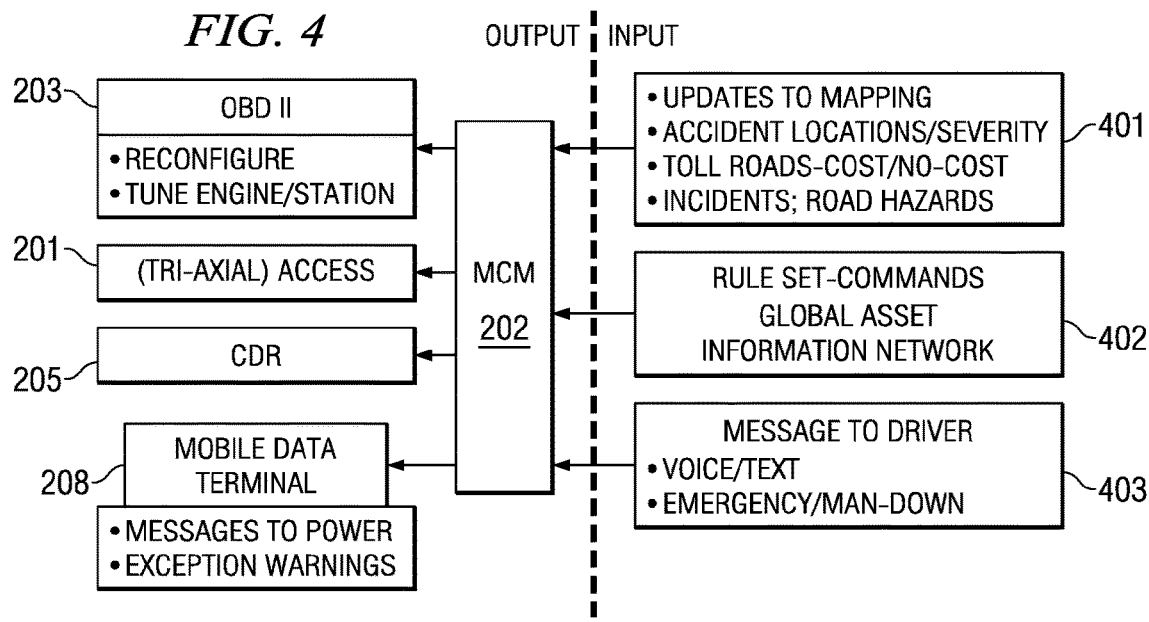
FIG. 4 is an illustration of exemplary inputs that may be provided to the MCM from the base station/server and which may include commands to reconfigure the rule set/logic of the MCM.

FIG. 4 is an illustration of exemplary inputs that may be provided to the MCM 202 from the base station 104 or server 105 and which may include commands to reconfigure the rule set/logic of the MCM 202. MCM 202 may receive mapping and routing information 401, such as mapping updates, accident information, and road information. MCM 202 may also receive instructions 402 which include updated, revised, or corrected rule sets, commands or logic to control the operation of MCM 202. Audible and visual messages 403 may also be sent via MCM 202 and then played or displayed to the driver. MCM 202 may use updated rule set 402, for example, to modify or configure the operation of vehicle systems via OBD 203. Control information may also be provided to the XLM or accelerometers 201, CDR 205, or the mobile data terminal 208.

Figure 5:
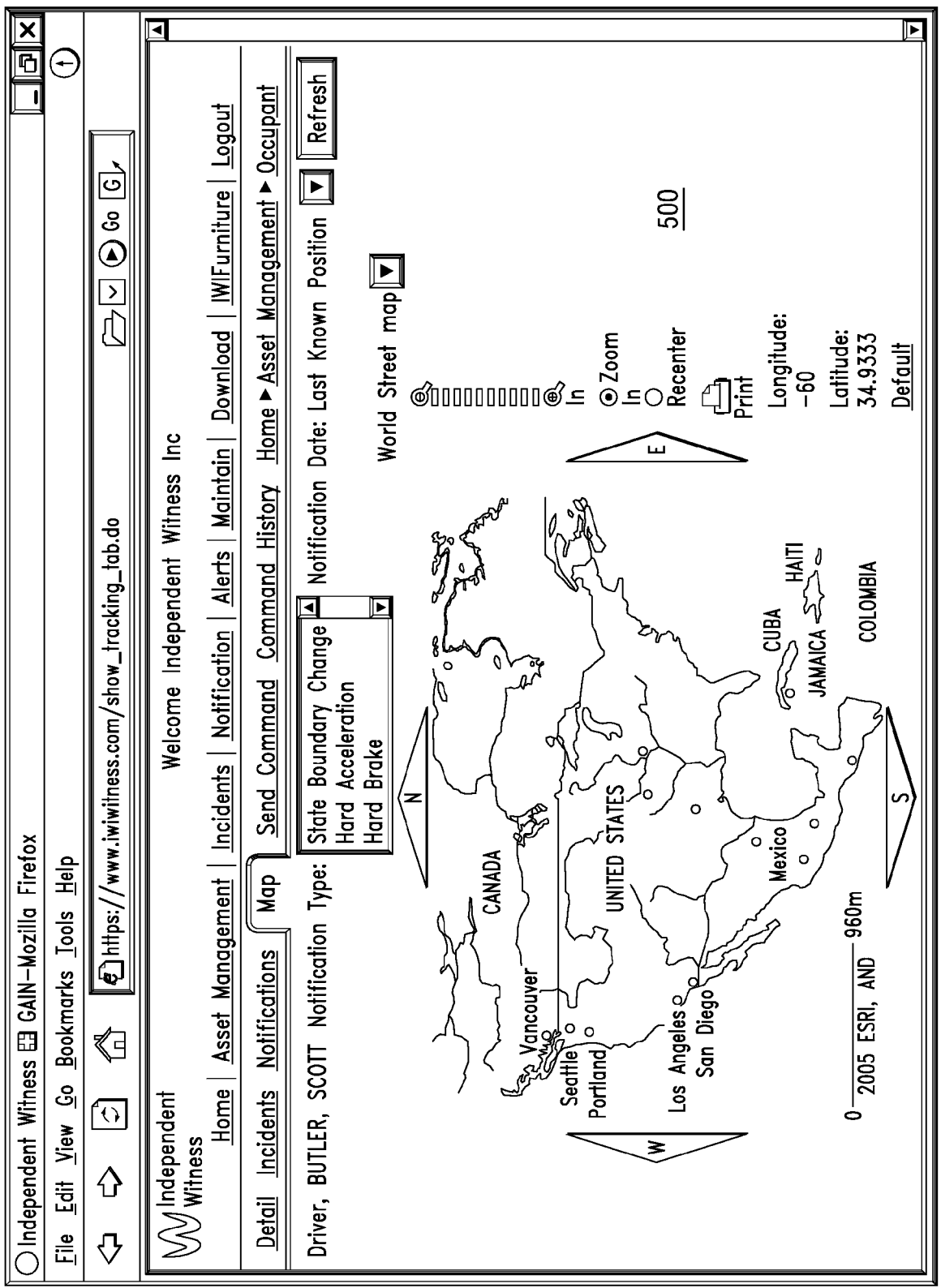
FIG. 5 is a sample graphic display of the DCS such as may be accessible from an internet portal after a user logs in and illustrating the provided capability of simultaneous viewing of driver and vehicle data such as geographic position of the vehicle as well as the ability to select from among multiple parameters for tracking vehicles and driver performance in addition to providing other options including issuing of commands to the MCM.

FIG. 5 is an example of the display 500 that may be accessible from internet portal 111 after a user logs in to GAIN system 110, for example. Display 500 provides the capability to simultaneously view driver and vehicle data, such as geographic position of the vehicle. The user also has the ability to select from among multiple parameters for tracking vehicles and driver performance in addition to providing other options including issuing of commands to the MCM 202.

In embodiments of the invention, a comprehensive driver monitoring and mentoring system installed in a vehicle has one or more of the following components. An on-board diagnostic (OBD) system operative to monitor vehicle parameters and to generate an OBD input signal representative thereof. The vehicle monitoring system may be enclosed in a sealable housing that is permanently or temporarily mountable on the vehicle. A crash data recorder (CDR) is included with the vehicle monitoring system and is configured to measure and record vehicle acceleration, including the magnitude, direction and profile of such accelerations, during a crash event and to generate CDR signals. An accelerometer module (XLM) contains at least one accelerometer, such as a tri-axial accelerometer, and is mounted within the housing. The XLM is operative to monitor driver performance by measuring acceleration in at least one of a lateral, longitudinal and/or vertical direction over a predetermined time period. The XLM generates an XL signal when acceleration exceeds a predetermined threshold. In one embodiment, the CDR and XLM may be combined so that one set of accelerometers serves both functions.

A GPS receiver mounted is preferably within the housing and is configured to track the location and directional movement of the vehicle and to generate a GPS signal. The vehicle's user may access the driver mentoring and monitoring system using a mobile data terminal (MDT), which preferably has a mechanism for communicating warnings to the user, such as a speaker or light. A master command module (MCM) mounted within the housing is operative to receive inputs from the CDR, XLM, OBD, GPS receiver, and MDT. The MCM is operative to transmit signals representative of one or more vehicle operating parameters. The MCM is further configured to generate audible and/or visual warning signals to the driver when at least one of the vehicle's movement characteristics exceed a predetermined threshold value.

A base station server is in communication with the driver mentoring and monitoring system and the MCM. The server has a data collection system (DCS) that is accessible through at least one server portal and being configured to receive data from the MCM at predetermined or random times and generate reports of driver performance. The server may also cause the MCM to transmit a warning signal to the vehicle when driver violations or exceptions are detected, such as speeding, hard turn, hard brake, hard vertical, cellular phone use, or a seatbelt violation. The MCM may send a notification to the server during other predetermined events, such as a panic alarm, man down, accident, uncorrected driver violations, or unauthorized vehicle movement.

The vehicle monitoring system is adapted to monitor driver performance and may be in continuous communication with a base station. The vehicle monitoring system comprises one or more of the following components. A self-contained CDR mountable on the vehicle and configured to measure vehicle crash impulses and generate CDR input signals representative thereof. An XL module mountable on the vehicle and operatable to measure vehicle acceleration in at least one of lateral, longitudinal and/or vertical directions and to generate XL input signals representative thereof. A mobile data terminal (MDT) mountable on the vehicle and operative to continuously transmit CDR and XL input signals from the vehicle to a base station. A driver warning device mounted on the vehicle.

In one embodiment, the base station is operative to receive the CDR input signals and to generate a crash signal when the crash impulses exceeds an impulse threshold value stored at the base station. The base station is operative to emit an alert signal at the base station to alert personnel of the accident. The base station is also operative to receive the XL input signals and generate an exception signal when vehicle acceleration exceeds an acceleration threshold value stored at the base station and transmit a command to the MDT to activate the driver warning device. The base station may have a data collection system (DCS) configured to receive data from the MCM and to record driver performance and to generate warnings for at least one of the following violations: hours of service (HOS), speeding, hard turn, hard braking, hard acceleration, hard vertical movement, failure to use seatbelt, failure to use headlights, and failure to use turn signal.

In addition to or in place of the logic contained in the base station, logic may also be included in the MCM to monitor the vehicle and driver performance and to generate warnings. The vehicle monitoring system may be in at least intermittent, if not continuous, communication with a base station. The vehicle monitoring system may comprise one or more of the following components. A self-contained CDR mountable on the vehicle and being configured to measure vehicle crash impulses and generate a crash signal when the crash impulses exceeds an impulse threshold value stored at the CDR. Software or firmware providing a methodology for collecting data at regular or non-regular intervals. An XL module mountable on the vehicle and operative to measure vehicle acceleration in at least one of lateral, longitudinal and/or vertical directions and to generate an exception signal when vehicle acceleration exceeds an acceleration threshold value stored at the XL module. A mobile data terminal (MDT) operative to intermittently transmit the crash and exception signals from the vehicle to the base station. A driver warning device may be mounted on the vehicle. The base station is operative to receive the crash and/or exception signals and to alert personnel.

The vehicle monitoring system may correlate accident data from the CDR and XL Modules to potential injuries. The present invention provides a system and method of correlating personal injury and property damage with driver behavior measured prior to a vehicle crash and impulse forces measured during the vehicle crash. The CDR may measure crash impulses and the XL module may monitor driver behavior in terms of hard turns, hard braking and hard vertical movement of the vehicle. In one embodiment of the present invention, a crash database comprising personal injury and property damage characteristics is generated. For example, characteristics of the injured person's age, gender, height, weight, occupation, hobbies, income, prior claims, physical condition, injury type and severity may be collected. Vehicle model, condition, damage type and location, as well as impact characteristics, such as acceleration magnitude and direction during the crash, change in velocity between the time of impact and at least one millisecond following impact.

The vehicle monitoring system records crash impulse forces acting upon the vehicle during the crash. Driver behavior prior to the accident is also recorded by measuring acceleration in at least one of lateral, longitudinal and/or vertical directions in order to identify hard turns, hard braking and hard vertical forces experienced by the vehicle up to the time of the accident. The vehicle crash impulse data is correlated to an injury characteristic, such as by correlating accident forces to bodily injury claims, in order to determine the probability of the vehicle crash as a causal factor of the bodily injury. The database may further include at least one of the following data sets: probability of settlement in an insurance claim filed in relation to the vehicle crash, average cost of settlement, and settlement structure.

The present invention may also be used for mentoring driver behavior using data collected from the XL module. In one embodiment, driver behavior may be monitored and/or modified in a vehicle having an OBD and/or GPS receiver and an accelerometer module, which may be an XL module containing at least one accelerometer. Preferably, the accelerometer module will be a tri-axial accelerometer. The system measures vehicle acceleration in at least one of lateral, longitudinal and/or vertical direction and may determine vehicle speed from a vehicle speedometer (via an OBD) or by inferring speed from GPS readings. The measured acceleration is compared to a predetermined threshold, and the speed is compared to a speed-by-street dataset. A warning signal is sent to the driver when the measured acceleration exceeds the threshold and/or when the speed exceeds those contained in the speed-by-street dataset. A timer may be started when the warning signal is sent to allow the driver a predetermined amount of time to reduce the acceleration or speed. A notification signal may be sent to a base station if the driver fails to reduce acceleration or speed during the predetermined amount of time. The timer may be configurable for any amount of time, including zero or no delay.

In order to provide more accurate measurements of driver behavior, in one embodiment, the present invention filters gravity out of accelerometer readings as the vehicle changes its horizontal surface orientation. Driver performance can be monitored and mentored in a vehicle having an accelerometer module, which may be an XL module containing at least one accelerometer. Preferably, the accelerometer module will be a tri-axial accelerometer. Acceleration is measured in at least one of lateral, longitudinal and/or vertical directions over a predetermined time period, which may be a period of seconds or minutes. An XL acceleration input signal is generated when a measured acceleration exceeds a predetermined threshold. Gravitational effects are filtered out of the longitudinal, lateral and vertical acceleration measurements when the vehicle is on an incline.

The present invention may also record road hazards at server database. This allows for optimization of vehicle routing in a fleet of vehicles each having a GPS receiver and a driver-activated hazard notation mechanism. The notation mechanism is activated by the driver of each vehicle when the vehicle encounters adverse road conditions, road hazards, or unsafe speed limits, for example. The notation mechanism generates a time-stamped notation signal including GPS positional data of the hazard along the road. The notation signal is transmitted to a base station for recording in a database. The location of the road hazard is then transmitted to other vehicles in the fleet.

The logic and rule sets used by the vehicle monitoring system described herein may be modified or reconfigure in real-time at the vehicle. The present invention provides for real-time revising of the reporting of vehicle behavior in a fleet management system. A base station is in communication with a fleet of vehicles each having an MCM or processor for receiving inputs from vehicle-mounted systems, including, for example, OBD, GPS receiver, CDR, MDT, and an XL module. The MCM contains an original rule set or logic for processing inputs from the vehicle-mounted systems. Commands may be transmitted from the base station to the MCM. The commands may include a revised rule set regarding processing of the inputs, such as the rules for comparing inputs to thresholds, reporting, and the like, at the MCM. The logic in the MCM is revised in response to the revised rule set command received from the base station. Inputs at the MCM are then processed according to the revised rule set. For example, the revised rule set may include a reduced lateral acceleration threshold as measured by the XL module and by which the measured lateral acceleration is compared to determine the occurrence of a driver violation. The revised rule set may also change reporting of the driver violation to the base station.

The present invention may also provide fleet location displays to a user. The location of a fleet of vehicles may be visualized in real-time on a web-based portal. The portal is linked to a server that is in communication with the vehicles. The vehicles each have an MCM for receiving inputs from vehicle-mounted systems, including an OBD, GPS receiver, CDR, MDT, and XL module. A number of display options may be selected for displaying the location of the vehicles on a geographic area or map. The options include, for example, displaying an entire fleet of vehicles, an individual vehicle in the fleet, a group of vehicles in the fleet wherein the vehicles are grouped by a predetermined set of criteria, such as by type of vehicle or load, vehicles in the fleet reporting exceptions to the base station with a previous time period of predetermined duration, or vehicles within a specific geographic zone.

The present invention also provides for modification of reporting intervals by the vehicle monitoring system. The reporting of fleet vehicle behavior characteristics to a base station or server may be configured in different ways. The following options are examples of vehicle behavior reporting characteristics: at predetermined time intervals, at random time intervals, upon request from the base station, upon occurrence of an exception, upon the occurrence of an emergency or specific event, such as panic alarm, man down, or theft. The reporting may be provided at the vehicle and/or at the base station by means of one of the following: e-mail, cell phone voice and/or text message, or pager message. The reporting includes the following driver violations, if they have occurred, hours of service, speeding, hard turn, hard braking, hard vertical, or failure to use seatbelt.

Embodiments of the invention provide a system and method for identifying speeding violations. Mapping data, including the location of streets and other landmarks and the speed limit data for individual streets (i.e. speed-by-street data), is available from companies such as NAVTEQ. In addition to NAVTEQ and other third-party speed-by-street database providers, the operator of the monitoring system described herein may develop their own speed-by-street database. The mapping data can be used in connection with a GPS receiver to display information to a driver such as current position, destination location, routing and the like. A vehicle's current location and speed can be compared to speed-by-street data to identify speeding violations. The speed-by-street data may be comprise actual posted speeds on individual streets, or may be generic speeds that are selected for different types of streets. The location of the vehicle is determined, for example, from a GPS receiver. The GPS location information is compared to a mapping database to determine what street or other roadway the vehicle is currently using. The speed of the vehicle can be determined from the GPS information, such as by calculating how fast the vehicle's position is changing, or, more likely, from the vehicle's speedometer reading. The vehicle's monitoring system may have direct access to the speedometer data or it may obtain the data from an on board diagnostic system or data bus. After identifying the current street that the vehicle is using, the vehicle monitoring system can look up the speed limit for that street in a speed-by-street database. The speed limit for the current street is then compared to the vehicle's current speed and the monitoring system determines if the vehicle is speeding.

A speeding condition may be identified simply by identifying when the vehicle's current speed is greater, by any amount, than the speed-by-street data. Alternatively, the vehicle's monitoring system may require that the vehicle's current speed exceed the speed-by-street data by a predetermined amount before identifying a speeding condition. For example, the monitoring system may reference a preset speeding parameter to identify a speeding condition. The speeding parameter may be a set number of miles-per-hour or kilometers-per-hour. If the vehicle's current speed exceeds the speed-by-street data by that amount, then a speeding condition is identified. The speeding parameter could be fixed for all streets so that the same amount of excess speed is required on all streets is required to identify a speeding condition. For example, if the speeding parameter is 5 MPH, then a speeding condition will be identified any time the vehicle's speed exceeds the speed-by-street data by 5 MPH.

Alternatively, the speeding parameter may be set to vary for different speed limits in the speed-by-street data. For example, the speeding parameter may be set to identify a speeding condition if the vehicle's speed is more than 3 MPH where the speed limit is 40 MPH or less, and more than 5 MPH on streets with a speed limit of greater than 40 MPH. It will be understood by those of skill in the art that the various speeding thresholds can be set for any number of posted speed limits or ranges of posted speed limits. In another embodiment, the speeding parameter may correspond to a percentage of the speed-by-street speed limit data. For example, the speeding parameter may be set such that when vehicle's speed was 10% greater than the speed-by-street data, then a speeding condition is identified.

Upon identifying a speeding condition, the monitoring system may provide an alert to the driver, such as a visual or audible alert or both. The monitoring system may maintain a record of such speeding violations. When a speeding condition is identified, the monitoring system may create a record including, for example, the vehicle's location, the speed-by-street data for that location, and the vehicle's speed. The record may be saved at the vehicle monitoring system or it may be transmitted to a central database or monitoring system server. Alternatively, when a speeding condition is identified, an alert may be sent to the central database or monitoring system server. The alert may include the vehicle's identification and location, the speed-by-street data for that location, and the vehicle's speed. The alert may be stored in a database and/or it may generate a message to a third party, such as a vehicle owner or fleet manager. In this embodiment, when an employee speeds in a fleet vehicle or when a teenager speeds in his parents' car, the fleet manager or the teenager's parents are notified of the speeding.

The speeding notification may be sent to the third party immediately. Alternatively, speeding notification messages may be stored and a notification sent at a certain intervals to identify speeding events for a particular period of time. For example, the monitoring system server may store speeding violation notification messages received in a twenty-four hour period. A single speeding notification message may then be sent once a day to the fleet manager or parents. The period for grouping speeding violation message is variable and could be selected depending upon the fleet manager or parents' needs. Additional notification criteria can be added to the notification process, such as collecting routine speeding notification messages to be forwarded at a regular interval, but immediately sending speeding notification messages when the speeding condition is excessive. For example, a fleet manager may configure the system to send a daily summary of all speeding violations for the fleet, but also choose to receive immediate notification if a fleet vehicle exceeds the speed limit by 15 or 20 MPH. This would allow the fleet manager to provide more immediate feedback or counseling to the speeding driver in addition to any in-vehicle warnings.

In other embodiments of the present invention, a speeding condition may not be identified merely for transient excess speed. Instead, the vehicle monitoring system may require that the speeding condition be present for a certain period of time before warning the driver, recording the speeding event, or notifying a central server or third parties. By requiring a probable speeding violation to occur for some period of time, transient events and false alarms may be eliminated or reduced. This would allow the driver to use excess speed, for example, when he is passing another vehicle or when the vehicle is merging into traffic.

FIG. 6 is a block diagram of a system incorporating one embodiment of the invention. Vehicle 601 having vehicle monitoring system 602 is traveling on street 603; and vehicle 604 having vehicle monitoring system 605 is traveling on street 606. Vehicles 601 and 604 may be any type of government, commercial or privately owned vehicle. Vehicles 601 and 604 may be in the same or different vehicle fleets or not assigned to any fleet. Monitoring systems 602 and 605 are configured to collect vehicle data, such as operating parameters and location information. As described herein, monitoring systems 602 and 605 may receive information from a GPS receiver and from OBD systems on vehicles 601 and 604, respectively. In particular, monitoring systems 602 and 605 are configured to receive or calculate at least location and speed data for vehicles 601 and 604, respectively.

Monitoring systems are in wireless communication with central monitoring server 607 via communication network 609. The wireless communication may be via satellite or cellular communication network or via any other private or public communication network or technology without limitation, including, for example, WiFi or Bluetooth communications. Preferably, the communication connection or link between the monitoring systems (602, 605) and server 607 is two-way communication that allows each entity to send information to the other. The communication link may be a continuous connection or it may be an intermittent connection that occurs either when either the monitoring systems (602, 605) or the server 607 have information to send or at regular intervals.

Server 607 is coupled to database 608, which holds information associated with vehicles 601 and 604 and other data relevant to the vehicle monitoring system. Database 607 and server 606 may be separate devices, or they may be incorporated into one device. Server 607 may be any processor-based device. Vehicle monitoring systems 602 and 605 have a speed-by-street database that identifies the posted speed limit for various streets and other roadways, including streets 603 and 606. Database 607 and server 606 may also store or have access to the speed-by-street database.

In one embodiment, when vehicle 601 exceeds the posted speed limit for street 603, monitoring system 602 identifies a speeding condition and records the speeding event. Although the present example refers to vehicle 601 and monitoring system 602, it will be understood to apply to any monitoring system in any vehicle. Monitoring system 602 may also send a speeding notification to server 607, which may also record the speeding event for vehicle 601. Server 607 may also access information from database 608 regarding vehicle 601 to determine if any third parties should be notified of the speeding condition. If a third party, such as a fleet manager or parent, should be notified of the speeding condition, then server 607 sends a notification to them via, for example, an email message to a computer 610, a call to telephone 611, a message to wireless phone or pager 612, or via any other messaging format. Server 607 may also group multiple speeding notifications together, such as notifications of speeding violations for an entire fleet and/or multiple speeding violations for a particular vehicle, and send reports to a third party, such as a fleet manager or parent.

Monitoring system 602 may identify a speeding condition merely because the speed of vehicle 601 has exceeded the posted speed of roadway 603 by any amount. Alternatively, monitoring system 602 may require the speed of vehicle 601 to exceed the posted speed by some threshold amount or percentage before identifying a speeding condition. In other embodiments, monitoring system 602 may require that the speed of vehicle 601 exceed the posted speed for street 603 for a preset time before identifying a speeding condition. Monitoring system 602 may alternatively require that the speed of vehicle 601 exceed the posted speed, as recorded in the speed-by-street database, both by some threshold amount and for some preset time. The speeding threshold and the preset time may be set by the driver of the vehicle or may be remotely set by server 607 via a wireless communication message.

Monitoring system 602 may be configured to use multiple speeding thresholds and may determine different courses of action based upon the thresholds that are exceeded. For example, if a first speeding threshold is exceed, monitoring system 602 may record the event, but provide no notification or warning. At a second speeding threshold, monitoring system 602 may record the event and provide a warning to the driver of vehicle 601. At a third speeding threshold, monitoring system 602 may record the event, provide a warning to the driver, and send a notification message to server 607. Other speeding threshold may be established that, when exceeded, will affect the operation of the vehicle. At a fourth speeding threshold, monitoring system 602 may restrict or limit the operation of vehicle 601's engine, for example, by reducing fuel flow or governing the engine's RPM. One of skill in the art will understand that any combination of these and other speeding threshold may be set in the vehicle monitoring system without requiring any of the thresholds to be used.

Figure 7:
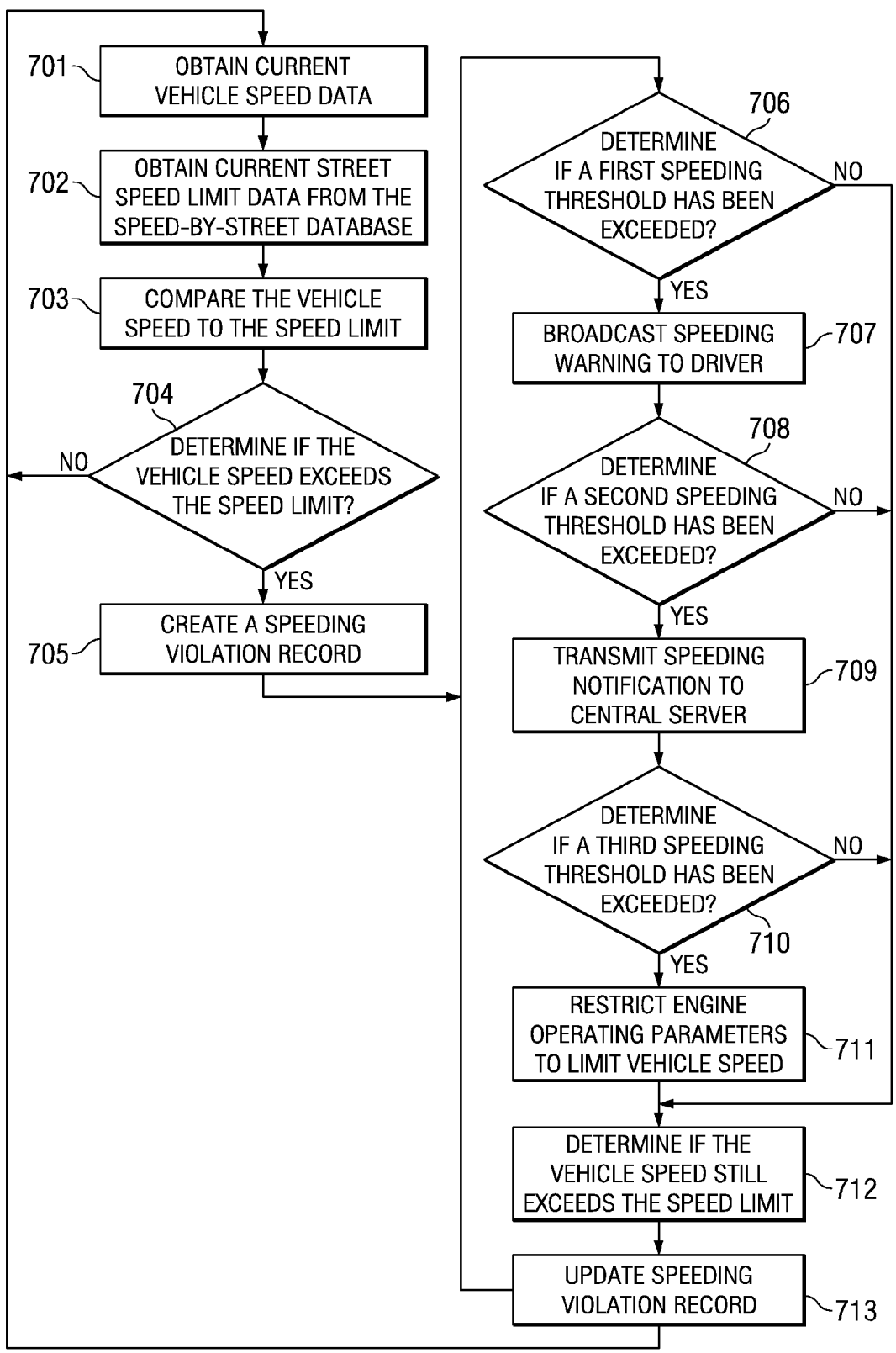
FIG. 7 is a flowchart illustrating one process for implementing the present invention.

FIG. 7 is a flowchart illustrating a method for identifying speeding violations according to one embodiment of the invention. It will be understood by those of skill in the art that the steps illustrated in FIG. 7 may occur in many different orders or even simultaneously and that the order listed in FIG. 7 is merely one example. The vehicle's monitoring system obtains current vehicle speed data (701) such as from the vehicle's speedometer, OBD or from GPS information. The monitoring system also obtains speed limit data for the current street from the speed-by-street database (702). The monitoring system compares the vehicle speed to the speed limit pulled from the speed-by-street database (703). The monitoring system determines if the vehicle speed exceeds the speed limit (704). If the vehicle speed does not exceed the speed limit, then the process begins again (704, 701).

Alternatively, if the vehicle speed does exceed the speed limit, then a speeding violation record is created by the monitoring system (705). The monitoring system then determines if a first threshold has been passed (706). If the first speeding threshold is passed, then a speeding warning, such as an audible message or tone or a visible message or warning light, is broadcast to the driver (707). If the first threshold has not been passed, then the monitoring system evaluates whether the vehicle is still exceeding the speed limit (712). If the vehicle is still speeding, then the speeding violation record is updated (713) and the monitoring system again determines if the vehicle has increased speed to violate the first speeding threshold (706). If the vehicle is no longer speeding, then the speeding violation record is closed (713) and the monitoring unit again evaluates the vehicle speed against updated speed limit data (701).

After warning the driver (707), the monitoring system then determines if a second speeding threshold has been exceeded (708). If the second speeding threshold has been exceeded, then monitoring system transmits a speeding notification to a central monitoring system server (709). If the second speeding threshold has not been exceeded, then monitoring system evaluates if a speeding condition still exists (712), updates the speeding record (713), and begins the process again if the vehicle is not speeding (701) or determines if the first threshold is still exceeded if the vehicle is still speeding (706).

After transmitting a notification to a central server (709), the monitoring system then determines if a third speeding threshold has been exceeded (710). If the third speeding threshold has been exceeded, then monitoring system restricts the vehicle's engine's operating parameters in an attempt to limit the vehicle's speed (711). If the third speeding threshold has not been exceeded, then monitoring system evaluates if a speeding condition still exists (712), updates the speeding record (713), and begins the process again if the vehicle is not speeding (701) or determines if the first threshold is still exceeded if the vehicle is still speeding (706).

After restricting the engine's operating parameters (711), the monitoring system then determines if the vehicle is still speeding (712), updates the speeding record (713), and begins the process again if the vehicle is not speeding (701) or determines if the first threshold is still exceeded if the vehicle is still speeding (706). As illustrated in the example of FIG. 7, the monitoring system may continue to update the speeding violation record, broadcast a warning to the driver, notify the central server, and further restrict engine operation as long as the vehicle's speed exceeds the respective thresholds for those events.

The speed-by-street database is generated using publicly available information regarding posted speed limits. This information may be collected, for example, from publications or by actually driving the streets and recording the posted speed limits. It is likely that errors will be present in the speed-by-street database due to incorrectly entered data and changes in the posted speeds. The present invention provides a method for identifying and correcting errors in the speed-by-street database.

For example, the speed-by-street database may incorrectly list the speed limit for street 603 (FIG. 6) as being 45 MPH, when the actual speed limit is 55 MPH. The data in the speed-by-street database may have been entered incorrectly, or the assigned speed limit for street 603 may have changed after the database was created. When vehicle 601 travels at the posted speed limit of 55 MPH on street 603, monitoring system 602 will identify a false speeding condition in which the posted speed is violated by 10 MPH. Depending upon the speeding threshold(s) that are set in monitoring system 602, one or more warnings or other notifications may be sent or recorded for this false speeding violation. As a result of the speed-by-street database error, the driver of vehicle 601 may receive unnecessary counseling or may receive a lower than deserved grade or evaluation of his driving habits.

Monitoring system 602 and/or server 607 can be used identify errors or potential errors in the speed-by-street database. When monitoring system 602 identifies a speeding violation, it may record the event in a local memory along with a location of the speeding violation. Over a period of time a number of such speeding violations will be recorded. Periodically, when a new speeding violation is added to memory, or at any other time, monitoring system 602 may review the speeding violation records to identify locations or streets where multiple speeding violations occur. For example, if vehicle 601 exceeds the speed-by-street database speed limit for street 603 on more than one occasion, then multiple speeding violations will be generated for that location. Records may be grouped as related violations if they occur at the same general location or on the same section of a street.

When the number of related violations reaches a predetermined number, monitoring system 602 may identify the location of these related violations as a potential error in the speed-by-street database. In the current example, because the posted speed limit for street 603 is 55 MPH and the database speed limit is 45 MPH, monitoring system 602 will generate a speeding violation record every time vehicle 601 traverses street 603 at the posted speed limit or slightly below the posted speed limit. Eventually, when enough of those violation records are linked together, monitoring system 602 may notify server 607 of the location (603) where multiple repeat violations are occurring. Alternatively, each time an in-vehicle monitoring system (602, 605) sends a speeding violation notification, server 607 may store that violation. Eventually, server 607 may correlate the speeding violations and identify an area of potential error in the speed-by-street database.

Server 607 may identify areas of potential error faster than an individual monitoring system because server 607 receives speeding notifications for numerous vehicles. Accordingly, server 607 may identify an area in which multiple vehicles are reporting multiple speeding violations. For less-traveled routes, server 607 may identify an area in which many vehicles report single speeding violations and that may be a location with an erroneous database entry.

Once server 607 identifies a location of potential speed-by-street error, either upon notification by an in-vehicle monitoring system (602, 605) or on its own, server 607 may issue a report or alert to an operator regarding the potential error. The operator can then evaluate the location, such as by having someone go to the location and observe the posted speed limits. If the posted speed limits do not match the speed-by-street database, then the database can be updated with the correct information. An update message may be sent to in-vehicle monitoring systems (602, 605) to provide corrections to their copy of the speed-by-street database. Alternatively, when the monitoring systems undergo routine updates, maintenance or repair, the speed-by-street database may be updated, replaced or corrected with the actual speed limit value for street 603.

In another alternative, if the speed-by-street database itself cannot be updated, a list of database errors can be maintained. This list of database errors may be stored at database 608 and/or sent to in-vehicle monitoring systems 602, 605. Upon identifying a speeding violation, monitoring system 602, 605 would then refer to the list of database errors to determine if the database speed limit for location of the speeding violation was correct. If the list of database errors did not include the current speeding location, then the monitoring system would operate normally. However, if the current speeding location was in the list of database errors, then the monitoring system may need to reevaluate the speeding condition. For example, the list of database errors may include a correct posted speed limit that the monitoring system could use in place of the database value. Alternatively or additionally, the list of database errors may include a list of alternative thresholds for the monitoring system 602, 605 to use in that location. The alternative thresholds would be adjusted relevant to the original threshold by the amount of the speed limit error, thereby preventing the reporting of misidentified speeding violations.

Similarly, server 607 may refer to a list of database errors upon receiving a speeding violation notification to ensure that the violation was correctly identified. Alternatively, sever 607 may compare the reported vehicle speed to an updated speed-by-street database to ensure that the speeding violation notification was proper. Server 607 would not record or report speeding notifications that were improperly identified due to speed-by-street data.

In addition to streets for which the speed-by-street database contained speed limit errors, other locations may be the source of multiple repeated speeding violations. For example, street 606 may be a highway with a posted speed limit of 55 MPH that is accurately recorded in the speed-by-street database in monitoring system 605 and database 608. However, normal traffic on highway 605 may travel at 65 MPH. Accordingly, vehicle 604 would be likely to follow the traffic flow, which would cause monitoring system 605 to generate a speeding violation. The speeding violation may be recorded locally, broadcast to the driver, or sent as a speeding notification to server 607. The driver is likely to ignore the speeding warning, if complying with the warning would cause him to fall behind traffic or be passed by many other vehicles.

Because numerous speeding violations would reported on street 606 for vehicle 604 or for numerous vehicles, monitoring system 605 or server 607 will eventually identify street 606 as having a potentially erroneous speed-by-street database entry. Upon identifying a potential database error, server 607 would report the location 606 to an operator, who may then have the location visually inspected. The inspection of street 606 would show that the speed-by-street database is correct. The operator could then decide whether to create an exception for street 606 in order to minimize the number of speeding violation reports for that location. If street 606 was a highly traveled route, then numerous correct (but difficult to avoid or prevent) speeding violations would be reported.

An observer may determine that vehicles traveling at 65 MPH was normal for street 606. The speed-by-street database could be updated on server 607, database 608, and/or monitoring system 602,605 to include a modified speed limit and speeding thresholds for street 606. The modified speed limit and speeding thresholds would minimize the number of reported speeding violations for that location. Vehicles that exceeded the modified speed limit would still generate speeding warnings and notifications. Accordingly, vehicles that exceeded the observed 65 MPH normal traffic flow on street 606 would create a speeding violation record, generate a warning to the driver, and be reported to server 607.

Instead of modifying the speed-by-street database with an observed normal traffic speed, street 606 may be listed as an exception. The exception list could me maintained by server 607 and/or monitoring system 602,605. When monitoring system 605 determines that vehicle 604 has exceeded the speed-by-street database speed limit, monitor 605 may determine if location 606 in on an exception list. The exception list may include a modified speed limit and/or modified speeding thresholds to be used in that location. Similarly, when server 607 receives a speeding violation notification, it may refer to an exception list to determine if the location of the speeding violation is to be treated as an exception. If the location is on the exception list, then speeding reports that show a vehicle to be traveling at or below an observed "normal" traffic speed would not be treated as speeding violations.

It is possible that server 607 and database 608 may have an updated speed-by-street database, while monitoring system 602, 605 have outdated speed-by-street databases. In that situation, upon receiving speeding violation reports from monitoring system 602, 605, server 607 would determine if the database used by the monitoring system was current. If the database was not current, then server 607 may reevaluate the speeding violation notification in view of updated speed-by-street data before recording or reporting the speeding event.

Figure 8:
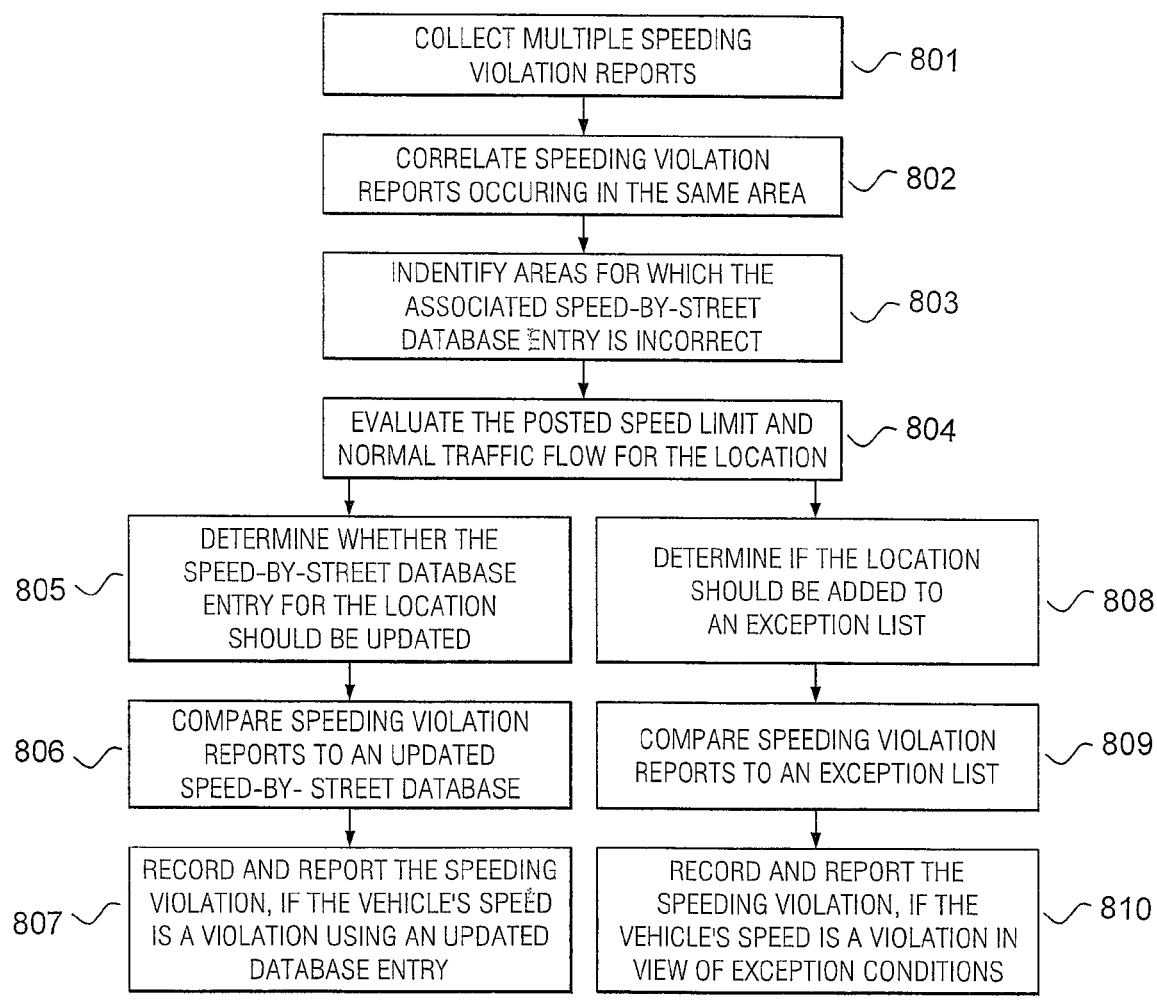
FIG. 8 is a flowchart illustrating an alternative process for implementing an alternative embodiment of the invention.

FIG. 8 is a flow chart illustrating a process for identifying potential errors in a speed-by-street database. Multiple speeding violation reports are collected by a in-vehicle monitoring system or by a central server (801). The speeding violation reports are correlated to identify multiple speeding violations occurring in the same location (802). Areas for which the associated speed-by-street database entry may be incorrect are identified from the correlated data (803). For areas that may have incorrect speed-by-street data, a visual inspection of posted speed limits or other investigation of the location or traffic flow may be conducted to determine the actual conditions for that location (804). Actual errors in the speed-by-street database or differences between the posted speed limit and normal traffic flow are identified. It is then determined whether to update the speed-by-street entry for the location (805) and/or to add the location to an exception list (808). Future speeding violations may be compared to an updated speed-by-street database (806) or to an exception list (809). The speeding violations may be recoded and reported if the vehicle's speed is considered a violation in view of the updated speed-by-street database (807) or the conditions in the exception list (810). It will be understood that the steps illustrated in the example of FIG. 8 may occur in any order or simultaneously and that other steps may also be used.

Figure 9:
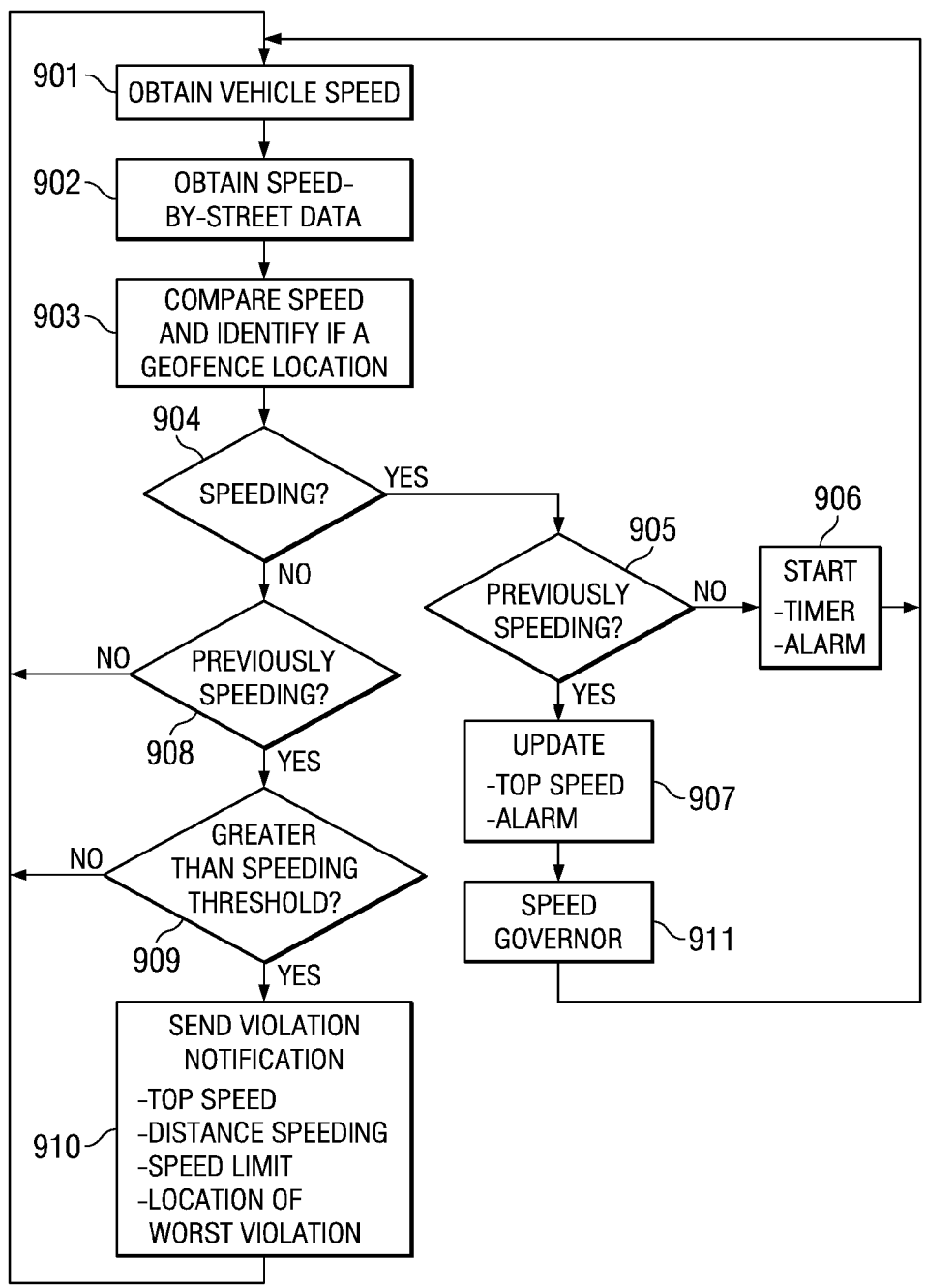
FIG. 9 is a flowchart illustrating an additional process for implementing an embodiment of the present invention.

FIG. 9 illustrates an alternative process for implementing the present invention. Vehicle speed is obtained (901), for example, by averaging GPS distance over time, vehicle speedometer data, speed reading from OBD/CAN bus, speed reading from electronic control unit (ECU) or electronic control monitor (ECM) bus, or other means. The speed-by-street value for a given GPS location is collected (902) and compared to the actual vehicle speed (903). Additionally, logic may be evaluated as part of the comparison to determine if the vehicle is in a geofence area having a speed limit. The geofence area is an area bounded by defined GPS coordinates, for example, for which the operator has established speed limits for the vehicle. If geofence speed limits exist, they will be used instead of the posted speed found in the speed-by-street database in the comparison (903).

After comparing actual vehicle speed to the relevant posted or geofence speed, a speed determination is made (904). If the vehicle speed is less than the posted database speed (i.e. the vehicle is not speeding), then the system checks to see if the vehicle was previously speeding (908). If the vehicle was not previously speeding then the logic is reset, and the system enters the comparative phase of the loop (901) again.

If the vehicle speed (901) is greater than the database speed (902), then it is determined that the vehicle is speeding (904). The system then looks to see if the vehicle was previously speeding (905). If the vehicle was not previously speeding (906) then the system starts a timer to track the duration of the speeding violation, monitors peak speeds, and initiates one or more alarms and/or alarm combinations (visual, audible, etc) and returns the logic to obtaining a next vehicle speed value (901). If the vehicle speed is determined to be speeding (904), and the vehicle was previously speeding (905), then the system updates the top speed of the vehicle, continues the timer, continues the alarms (907) and returns the logic to obtaining the next vehicle speed value (901).

If the vehicle is not speeding (904), the system looks to see if the vehicle was previously speeding (908). If the vehicle was previously speeding, then the system then checks to see if the speeding continued beyond a predetermined threshold of time (909). If the speeding did not last long enough to reach the speeding threshold, then no notification is sent and the process returns to obtain the current vehicle speed (901). If the speeding violation is greater than the speed threshold, a notification (910) is sent to a third party, such as a fleet manager, vehicle owner or the like. The speeding threshold may be any length of time, including zero (i.e. the notification may be sent without waiting to observe the duration of the speeding violation). The notification may include one or more of the following: top speed, distance traveled while speeding, posted speed limit, location of worst excess speed. The process then returns the logic to obtaining the next vehicle speed value (901). An excess speed threshold may be set so that any time the vehicle's speed measurement (901) exceeds a preset value, then an alarm may automatically be sent without waiting to determine how long the speeding violation lasts. For example, a vehicle may need to exceed the speed limit by 10 MPH for 30 seconds to generate an alarm notification, but a speed of 90 MPH will immediately generate a violation notice without regard for the during of that speed. Additionally, if the vehicle continues to speed, a speed governor (911) may be used to limit the speed of the vehicle.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A vehicle monitoring device installed in a vehicle, comprising:
   a GPS receiver that is configured to identify a GPS location of the vehicle monitoring device;
   a timer that is manually activatable and that is configured to expire, subsequent to being activated, after a predetermined period of time unless the timer is deactivated prior to expiration of the timer; and
   a monitoring command module that is connected to the GPS receiver and the timer and that is configured to transmit different signals to a remote server, the different signals including a GPS signal that identifies the GPS location of the vehicle monitoring device and a man down signal in response to detecting the expiration of the timer, wherein the monitoring command module transmits the man down signal in response to detecting the expiration of the timer which occurs in response to the timer being manually activated and without being deactivated prior to the expiration of the timer, and wherein the vehicle monitoring device is connected to the vehicle and the timer is manually activated by a user within the vehicle, but wherein the timer expires and the man down signal is transmitted while the user is outside of the vehicle.

2. The vehicle monitoring device of claim 1, wherein the monitoring command module is configured to transmit the different signals to the remote server according to a sequence defined by a hierarchy in which the man down signal has a higher priority than a crash event signal that is generated by the monitoring command module in response to detecting a crash event with a vehicle attached to the vehicle monitoring device.

3. The vehicle monitoring device of claim 1, wherein the monitoring command module is configured to transmit the different signals to the remote server according to a sequence defined by a hierarchy in which the man down signal has a lower priority than a crash event signal that is generated by the monitoring command module in response to detecting a crash event with a vehicle attached to the vehicle monitoring device.

4. The vehicle monitoring device of claim 1, wherein the vehicle monitoring device further comprises a panic button which, when pressed, causes the monitoring command module to send a panic signal to the remote server.

5. The vehicle monitoring device of claim 4, wherein the monitoring command module is configured to transmit the different signals to the remote server according to a sequence defined by a hierarchy in which the man down signal has a lower priority than the panic signal.

6. The vehicle monitoring device of claim 4, wherein the monitoring command module is configured to transmit the different signals to the remote server according to a sequence defined by a hierarchy in which the man down signal has a higher priority than the panic signal.

7. The vehicle monitoring device of claim 1, wherein the predetermined period of time is an hour.

8. The vehicle monitoring device of claim 1, wherein the predetermined period of time is a period of time other than an hour.

9. A method for operating a vehicle monitoring device installed in a vehicle that includes a GPS receiver, a timer and a monitoring command module, the method comprising:
   utilizing the GPS receiver to identify a GPS location of the vehicle monitoring device;
   activating the timer, wherein the timer expires after a predetermined period of time, subsequent to being activated, unless the timer is deactivated prior to expiration of the timer; and
   utilizing the monitoring command module, which is connected to the GPS receiver and the timer, to transmit different signals to a remote server, the different signals including a GPS signal that identifies the GPS location of the vehicle monitoring device and a man down signal in response to detecting the expiration of the timer, wherein the monitoring command module transmits the man down signal in response to detecting the expiration of the timer which occurs in response to the timer being manually activated and without being deactivated prior to the expiration of the timer, and wherein the vehicle monitoring device is connected to the vehicle and the timer is manually activated by a user within the vehicle, but wherein the timer expires and the man down signal is transmitted while the user is outside of the vehicle.

10. The method of claim 9, wherein the monitoring command module transmits the different signals to the remote server according to a sequence defined by a hierarchy in which the man down signal has a higher priority than a crash event signal that is generated by the monitoring command module in response to detecting a crash event with a vehicle attached to the vehicle monitoring device.

11. The method of claim 9, wherein the monitoring command module transmits the different signals to the remote server according to a sequence defined by a hierarchy in which the man down signal has a lower priority than a crash event signal that is generated by the monitoring command module in response to detecting a crash event with a vehicle attached to the vehicle monitoring device.

12. The method of claim 9, wherein the vehicle monitoring device further comprises a panic button and wherein the method further includes generating a panic signal in response to detecting a manual activation of the panic button.

13. The method of claim 12, wherein the monitoring command module transmits the different signals to the remote server according to a sequence defined by a hierarchy in which the man down signal has a lower priority than the panic signal.

14. The method of claim 12, wherein the monitoring command module transmits the different signals to the remote server according to a sequence defined by a hierarchy in which the man down signal has a higher priority than the panic signal.

15. The method of claim 9, wherein the predetermined period of time is an hour.

16. The method of claim 9, wherein the predetermined period of time is a period of time other than an hour.

* * * * *

UNITED STATES PATENT AND TRADEMARK OFFICE
CERTIFICATE OF CORRECTION

PATENT NO. : 10,522,033 B2  
APPLICATION NO. : 15/810958  
DATED : December 31, 2019  
INVENTOR(S) : McClellan et al.

Page 1 of 2

It is certified that error appears in the above-identified patent and that said Letters Patent is hereby corrected as shown below:

On the Title Page

Item (63), Related U.S. Application Data, change "14/516,879" to –14/516,876–

In the Specification

Column 2  
Line 5, change "vehicle" to –vehicles–  
Line 67, change "wireless" to –wirelessly–

Column 8  
Line 12, change "by the" to –by far the–

Column 14  
Lines 20-21, change "at server" to –at a server–  
Line 33, change "reconfigure" to –reconfigured–

Column 15  
Line 17, change "occurred," to –occurred:–  
Line 32, remove [be]  
Line 63, remove second instance of "is required"

Column 17  
Line 28, remove first instance of "either"

Column 18  
Line 64, change "then monitoring" to –then the monitoring–  
Lines 66-67, change "then monitoring" to –then the monitoring–

Signed and Sealed this  
Fifteenth Day of September, 2020

Andrei Iancu  
*Director of the United States Patent and Trademark Office*

CERTIFICATE OF CORRECTION (continued)
U.S. Pat. No. 10,522,033 B2

Column 19
Lines 55-56, change "used identify" to –used to identify–

Column 21
Line 21, change "would reported" to –would be reported–

Column 21
Line 49, change "me" to –be–